(12) United States Patent
Nishihara et al.

(10) Patent No.: US 8,423,796 B2
(45) Date of Patent: Apr. 16, 2013

(54) STORAGE DEVICE AND DATA PROCESSING METHOD OF STORAGE DEVICE

(75) Inventors: Shin Nishihara, Odawara (JP); Shuichi Yagi, Ninomiya (JP); Yasuyuki Nagasoe, Kaisei (JP)

(73) Assignee: Hitachi, Ltd., Tokyo (JP)

( * ) Notice: Subject to any disclaimer, the term of this patent is extended or adjusted under 35 U.S.C. 154(b) by 804 days.

(21) Appl. No.: 12/234,805

(22) Filed: Sep. 22, 2008

(65) Prior Publication Data
US 2010/0031062 A1 Feb. 4, 2010

(30) Foreign Application Priority Data
Jul. 29, 2008 (JP) ................................. 2008-194742

(51) Int. Cl.
*G06F 11/30* (2006.01)
(52) U.S. Cl.
USPC .......................................................... 713/193
(58) Field of Classification Search ................... 713/193
See application file for complete search history.

(56) References Cited

U.S. PATENT DOCUMENTS

| | | |
|---|---|---|
| 2005/0220305 A1 | 10/2005 | Fujimoto et al. |
| 2007/0169186 A1 | 7/2007 | Ueoka et al. |
| 2007/0192557 A1 | 8/2007 | Kezuka et al. |
| 2008/0092029 A1 | 4/2008 | Arakawa et al. |
| 2008/0126813 A1 | 5/2008 | Kawakami et al. |
| 2009/0172786 A1 * | 7/2009 | Backa ............................... 726/4 |

FOREIGN PATENT DOCUMENTS

JP 2005-322201 11/2005

OTHER PUBLICATIONS

Seagate: "The Benefits of Self-Encrypting Drives in the Data Center," [online], Apr. 1, 2008; (pp. 1-7), retrieved from the Internet: URL/ http://www.lsi.com/campaigns/forms/security_cw/downloads/pdf/ TP590.1-0804US_lr.pdf.

Extended European Search Report in EP 09150943, dated Feb. 7, 2011 [8 pages].

\* cited by examiner

*Primary Examiner* — Jacob Lipman
(74) *Attorney, Agent, or Firm* — Antonelli, Terry, Stout & Kraus, LLP.

(57) ABSTRACT

A storage device and a data processing method of the storage device are provided which can prevent leaking of data attributed to stealing or taking out of a disk device. The storage device includes: disk adapters, each connected to HDDs which constitute one or more RAID groups; and a management part which manages a storage area provided by the HDDs in a state that the storage area is divided into logical storage areas, and manages the RAID groups. The management part sets an encryption state indicative of whether or not the data is to be encrypted with respect to the RAID groups when all of the disk adapters are connected to the HDDs which belong to the RAID groups are encryption adapters. The management part also encrypts, based on the encryption state set with respect to the RAID groups, and stores the encrypted data in the HDD.

20 Claims, 21 Drawing Sheets

| DKA-ID | DKA KIND |
|---|---|
| 0 | COMPATIBLE WITH ENCRYPTION |
| 1 | COMPATIBLE WITH ENCRYPTION |
| 2 | INCOMPATIBLE WITH ENCRYPTION |
| 3 | INCOMPATIBLE WITH ENCRYPTION |
| ⋮ | ⋮ |

200A: DKA-ID
200B: DKA KIND

| RG-ID | RG CONFIGURATION | DKA-ID | | | |
|---|---|---|---|---|---|
| 0 | 3D+1P | 0 | 8 | | |
| 1 | 2D+2D | 1 | 9 | | |
| 2 | 7D+1P | 6 | 7 | 14 | 15 |
| ⋮ | ⋮ | ⋮ | ⋮ | ⋮ | ⋮ |

300A: RG-ID
300B: RG CONFIGURATION
300C: DKA-ID

| RG-ID | ENCRYPTION SETTING | LDEV-ID |
|---|---|---|
| 0 | ON | 00 |
|  |  | 01 |
|  |  | : |
|  |  | 0N |
| 1 | OFF | 10 |
|  |  | 11 |
|  |  | : |
|  |  | 1N |
| : | : | : |

400A — RG-ID
400B — ENCRYPTION SETTING
400C — LDEV-ID

| DEVICE MANUFACTURING SERIAL NUMBER | EXTERNAL CONVERTED ENCRYPTION KEY | HASH VALUE |
|---|---|---|
| 99999 | AAAAAAAA | 1 |
| : | : | : |

500A — DEVICE MANUFACTURING SERIAL NUMBER
500B — EXTERNAL CONVERTED ENCRYPTION KEY
500C — HASH VALUE

STORAGE DEVICE AND DATA PROCESSING METHOD OF STORAGE DEVICE

CROSS REFERENCES TO RELATED APPLICATIONS

This application relates to and claims priority from Japanese Patent Application No. 2008-194742, field on Jul. 29, 2008, the entire disclosure of which is incorporated herein by reference.

BACKGROUND OF THE INVENTION

1. Field of the Invention

The present invention relates to a storage device for storing data in a plurality of disk devices and a data processing method of the storage device.

2. Description of the Related Art

Conventionally, as this type of storage system, there has been known a storage system which enables data transmission with a server, wherein the storage system includes a channel IF unit having an interface with the server, and an encryption and decryption unit for encrypting data to be transmitted to the server and decrypting the data received from the server is provided to the inside of the channel IF unit (see JP-A-2005-322201 (patent document 1)).

On the other hand, in the encryption processing used by a conventional storage system, whether data is to be encrypted or not is set for every logical device (hereafter referred to as LDEV (Logical Device)) unit which is obtained by virtually dividing a device for storing data, for example, a hard disk (hereinafter referred to as HDD) into a plurality of LDEV units. Accordingly, encrypted areas and non-encrypted areas are present in mixture in the HDD and hence, when the HDD is stolen or taken out to the outside, there exists a possibility of leaking of data of the non-encrypted areas.

SUMMARY OF THE INVENTION

The present invention has been made to overcome such a drawback and it is an object of the present invention to provide a storage device and a data processing method of the storage device for preventing leaking of data attributed to stealing or taking out of a disk device.

To achieve the above-mentioned object of the present invention, according to one aspect of the present invention, there is provided a storage device which stores data in a plurality of disk devices, the storage device including: a plurality of adapters each of which is connected to the plurality of disk devices which constitutes at least one RAID group; and a management part which manages a storage area provided by the plurality of disk devices in a state that the storage area is divided into a plurality of logical storage areas, and manages the plurality of RAID groups, wherein the plurality of disk devices respectively constitutes the RAID group in accordance with every disk device, at least one of the plurality of adapters is an encryption adapter capable of encrypting the data, the management part sets an encryption state indicative of whether or not the data is to be encrypted with respect to the RAID group when all of the adapters connected to the disk devices which belong to the RAID group are the encryption adapters, and the encryption adapter encrypts, based on the encryption state set with respect to the RAID group to which the disk device constituting a storage destination of the data belongs, the data and stores the encrypted data in the disk device.

According to this storage device, the encryption state is set with respect to the RAID group and the data is encrypted based on the set encryption state and is stored in the disk devices and hence, the disk device which constitutes the RAID group takes only either one of the mode in which the disk device stores the data with encryption and the mode in which the disk device stores the data without encryption. Accordingly, there is no possibility that the encryption areas in which the encrypted data is stored and the non-encryption areas in which the data which is not encrypted is stored are present in mixture in one disk device.

The storage device may preferably be configured such that the management part displays the encryption state of the logic storage area corresponding to the RAID group based on the encryption state set with respect to the RAID group.

Due to such a storage device, based on the encryption state set with respect to the RAID group, the encryption state of the logical storage area corresponding to the RAID group can be displayed and hence, for example, in performing an operation such as data migration or data copying, an administrator can be informed of the encryption state for every logical storage area.

Further, to achieve the above-mentioned object of the present invention, according to another aspect of the present invention, there is provided a data processing method of a storage device which stores data in a plurality of disk devices, wherein the storage device includes: a plurality of adapters each of which is connected to the plurality of disk devices which constitutes at least one RAID group; and a management part which manages a storage area provided by the plurality of disk devices in a state that the storage area is divided into a plurality of logical storage areas, and manages the plurality of RAID groups, wherein the plurality of disk devices respectively constitutes the RAID group in accordance with every disk device, and at least one of the plurality of adapters is an encryption adapter capable of encrypting the data, wherein the data processing method includes: a first step in which the management part sets an encryption state indicative of whether or not the data is to be encrypted with respect to the RAID group when all of the adapters connected to the disk devices which belong to the RAID group are the encryption adapters, and a second step in which the encryption adapter encrypts, based on the encryption state set with respect to the RAID group to which the disk device constituting a storage destination of the data belongs, the data and stores the encrypted data in the disk device.

According to this data processing method of a storage device, the encryption state is set with respect to the RAID group and the data is encrypted based on the set encryption state and is stored in the disk devices and hence, the disk device which constitutes the RAID group takes only either one of the mode in which the disk device stores the data with encryption and the mode in which the disk device stores the data without encryption. Accordingly, there is no possibility that the encryption areas in which the encrypted data is stored and the non-encryption areas in which the data which is not encrypted is stored are present in mixture in one disk device.

The data processing method of a storage device may preferably include, after the first step, a third step in which the management part displays the encryption state of the logical storage area corresponding to the RAID group based on the encryption state set with respect to the RAID group.

Due to such a data processing method of a storage device, based on the encryption state set with respect to the RAID group, the encryption state of the logical storage area corresponding to the RAID group can be displayed and hence, for example, in performing an operation such as data migration or data copying, an administrator can be informed of the encryption state for every logical storage area.

According to the present invention, the disk device which constitutes the RAID group takes only either one of the mode in which the disk device stores the data with encryption and the mode in which the disk device stores the data without encryption and hence, there is no possibility that the encryption areas in which the encrypted data is stored and the non-encryption areas in which the data which is not encrypted is stored are present in mixture in one disk device. Accordingly, it is possible to prevent leaking of data attributed to stealing or taking out of the disk device.

BRIEF DESCRIPTION OF THE DRAWINGS

FIG. 6 is a constitutional view for explaining one example of a disk adapter management table shown in FIG. 1;

FIG. 7 is a constitutional view for explaining one example of a RAID group management table shown in FIG. 1;

FIG. 8 is a constitutional view for explaining one example of an encryption management table shown in FIG. 1;

FIG. 9 is a constitutional view for explaining one example of an external backup information table shown in FIG. 1;

DESCRIPTION OF THE PREFERRED EMBODIMENTS

Hereinafter, one embodiment of the present invention is explained in detail in conjunction with drawings.

Figure 1:
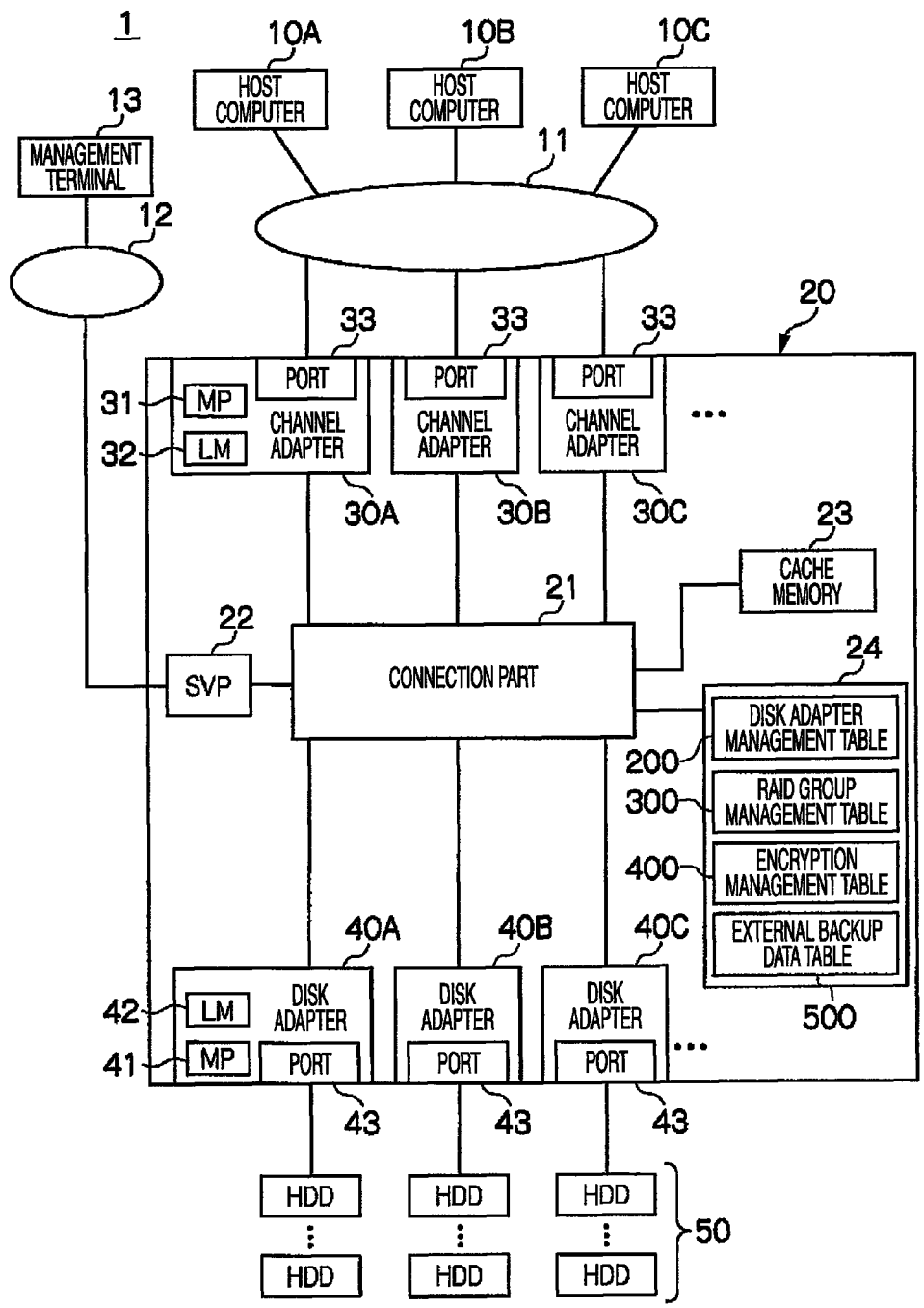
FIG. 1 is a block diagram for explaining the constitution of a storage system.

FIG. 1 is a block diagram for explaining the constitution of a storage system. As shown in FIG. 1, a storage system 1 includes a plurality of host computers 10 (10A, 10B, 10C), a storage device 20 which is connected with the respective host computers 10A to 10C via a communication network 11, and a plurality of HDDs (Hard Disk Drives) 50 which are connected with the storage device 20.

Each host computer 10A, 10B, 10C is constituted of a computer device provided with a CPU, memories and the like. The host computer logically recognizes storage areas provided by the storage device 20 and executes a business application program such as a database software by making use of the logical storage area (hereinafter, refer red to as logical volume or LDEV). Here, the host computer 10 is one example of an upper system with respect to the storage device 20.

The communication network 11 is constituted of a LAN (Local Area Network), a SAN (Storage Area Network), the Internet, a special-purpose line, a public line or the like. The data communication between the host computer 10 and the storage device 20 is performed in accordance with a TCP/IP (Transmission Control Protocol/Internet Protocol) or a Fiber Channel Protocol, for example.

The storage device 20 includes a plurality of channel adapters 30 (30A, 30B, 30C), a plurality of disk adapters 40 (40A, 40B, 40C), a connection part 21, an SVP (Service Processor) 22, a cache memory 23 and a shared memory 24. The storage device 20 is constituted as a disk array subsystem or a highly-functional intelligent-type fiber channel switch, for example.

In this embodiment, the storage device 20 is connected with a plurality of HDDs 50 arranged outside the storage device 20. However, the present invention is not limited to such constitution, and the storage device 20 may incorporate the plurality of HDDs 50 therein.

Each channel adapter 30A, 30B, 30C is a microcomputer which includes a microprocessor (hereinafter, referred to as MP) 31, a local memory (hereinafter, referred to as LM) 32, a port 33 and the like, and mainly functions as an interface with the host computer 10. The MP 31 executes a microprogram which processes a command transmitted from the host computer 10, and an LM 32 stores the microprogram. The port 33 is connected with the host computer 10 via the communication network 11.

Each disk adapter 40A, 40B, 40C is constituted of a microcomputer which includes an MP 41, an LM 42 and a port 43 and the like, and mainly functions as an interface with the HDD 50 described later. The MP 41 executes a microprogram which controls the HDD 50 connected to the port 43, and the LM 42 stores the microprogram and the like. Here, the number of the MP 41 is not limited to one and may be two or more. To the port 43, one or a plurality of HDDs 50 is connected, and the port 43 and the HDD 50 are connected to each other by an interface system such as a FC-AL (Fibre Channel Arbitrated Loop) which is a fiber channel, fabric or an SAS (Serial Attached SCSI).

The disk adapter 40 converts a data access request based on logical address designation transmitted from the host computer 10 into a data access request based on physical address designation. That is, an address of the designated logical storage area is expressed as a physical address of a physical storage area, and reading or writing of data is performed with respect to the storage area of the HDD 50 corresponding to the physical address. Further, the disk adapter 40 performs data access corresponding to the RAID configuration of the HDDs 50.

Each HDD 50 is a disk device which provides a storage area to the host computer 10, and the plurality of HDDs 50 respectively constitute a disk array of RAID (Redundant Array of Inexpensive Disks) type in accordance with every HDD.

The connection part 21 connects the respective channel adapters 30A to 30C, the respective disk adapters 40A to 40C, the SVP 22, the cache memory 23 and the shared memory 24 with each other. The connection part 21 is constituted of a high-speed bus such as an ultrahigh-speed cross bus switch which performs data transmission by high-speed switching, for example.

The SVP 22 is a processor which performs management and monitoring of the storage device 20. The SVP 22 manages the storage device 20 by dividing storage areas which the plurality of HDDs 50 provides into a plurality of logical storage areas and, at the same time, manages the storage device 20 by dividing the plurality of HDDs 50 into a plurality of RAID groups. Further, the SVP 22 is connected to an external management terminal 13 by way of a network 12, and the administrator of the storage system 1 can manage various settings of the storage device 20 by operating the external management terminals 13. Here, the respective disk adapters 40A to 40C constantly monitor states of the HDDs 50 to which the respective disk adapters 40A to 40C are connected, and a monitor result is transmitted to the SVP 22 by way of the connection part 21.

The network 12 is constituted of a LAN or the like, and the management terminal 13 is constituted of a computer device provided with a CPU, memories and the like. Here, the network 12 may be constituted by making use of the above-mentioned communication network 11.

The cache memory 23 and the shared memory 24 are memories which the respective channel adapters 30A to 30C, the respective disk adapters 40A to 40C and the SVP 22 use in common via the connection part 21. The cache memory 23 is mainly used for temporarily storing data. The shared memory 24 is mainly used for storing control information, command and the like. Further, the shared memory 24 stores a disk adapter management table 200, a RAID group management table 300, an encryption management table 400 and an external backup information table 500 described later.

In the explanation made hereinafter, the MPs 41 of the respective disk adapters 40A to 40C are allowed to directly access the shared memory 24 to acquire the data stored in the shared memory 24. However, the present invention is not limited to such configuration and the data stored in the common memory 24 may be copied to the LMs 42 of the respective disk adapters 40A to 40C periodically or when necessary, and the MPs 41 may access the LMs 42.

Here, the manner of operation of the channel adapter 30 and the disk adapter 40 is explained schematically.

For example, when the channel adapter 30 receives a read command from the host computer 10, the read command is stored in the shared memory 24. The disk adapter 40 constantly looks up the shared memory 24 and, when an unprocessed read command is found, the disk adapter 40 reads data from the HDD 50 in accordance with the read command stored in the shared memory 24 and stores the data in the cache memory 23. The channel adapter 30 reads the data stored in the cache memory 23 and transmits the data to the host computer 10 which constitutes a source of the read command.

Further, when the channel adapter 30 receives write data and a write command from the host computer 10, the write command is stored in the shared memory 24 and the write data is stored in the cache memory 23. The disk adapter 40 stores the received data which is stored in the cache memory 23 in the HDD 50 in accordance with the write command stored in the shared memory 24.

Figure 2:
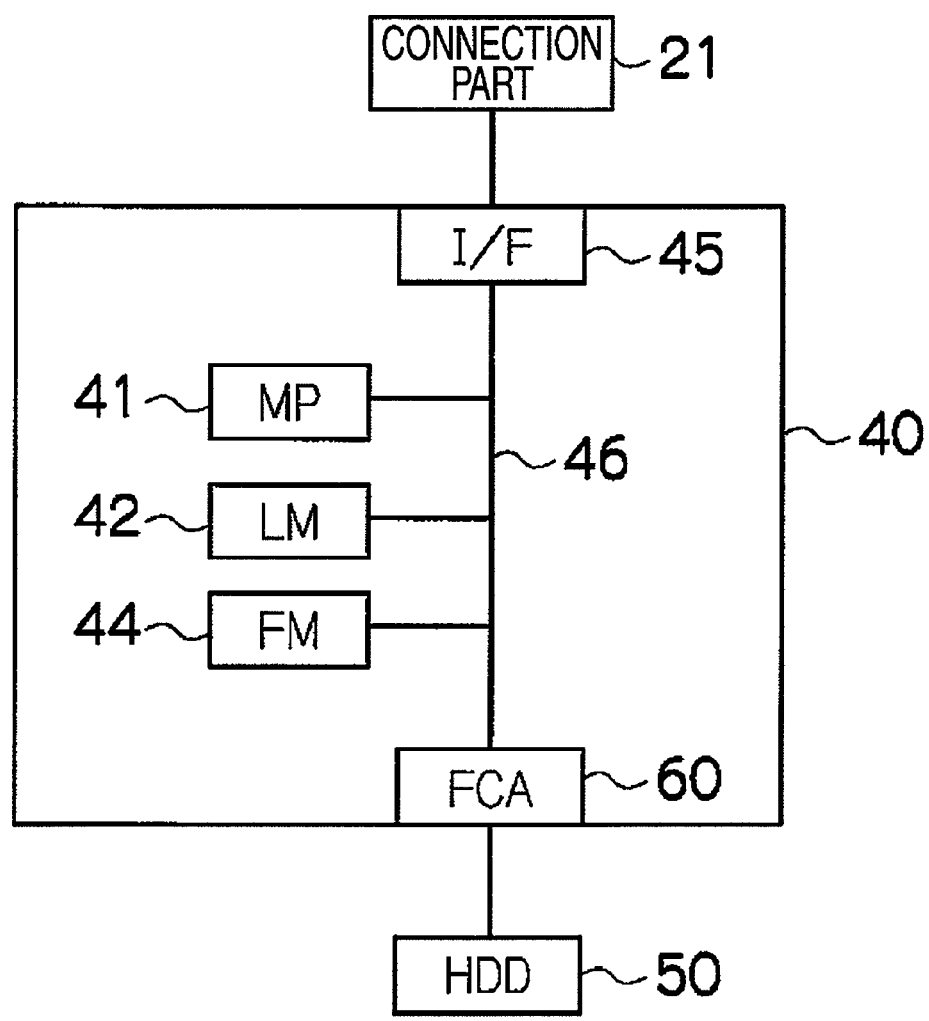
FIG. 2 is a block diagram for explaining the constitution of a disk adapter shown in FIG. 1.

FIG. 2 is a block diagram for explaining the constitution of the disk adapter shown in FIG. 1. As shown in FIG. 2, the disk adapter 40 includes, in addition to the above-mentioned MP 41 and LM 42, an interface (I/F) 45 and a fibre channel adapter module (hereinafter, referred to as FCA) 60. The MP 41, the LM 42, the interface (I/F) 45 and the FCA 60 are connected with each other via an internal bus 46. The internal bus 46 is connected to the predetermined HDD 50 via the FCA 60 and is connected to the connection part 21 via the interface 43.

In the plurality of disk adapters 40 provided to the storage device 20, at least one FCA 60 includes an encryption and decryption circuit 70 described later. The disk adapter 40 having the encryption and decryption circuit 70 (hereinafter, referred to as encryption disk adapter 40) includes a flash memory (hereinafter, referred to as FM) 44 connected to the internal bus 46. The FM 44 is a non-volatile medium constituted of an EEPROM (Electrically Erasable programmable ROM) and the like and is mainly used for storing an internal conversion encryption key described later.

The encryption disk adapter 40 can encrypt the data stored in the cache memory 23 and can store the data in the HDD 50. Further, the encryption disk adapter 40 can decrypt the encrypted data stored in the HDD 50 and can store the decrypted data in the cache memory 23.

Figure 3:
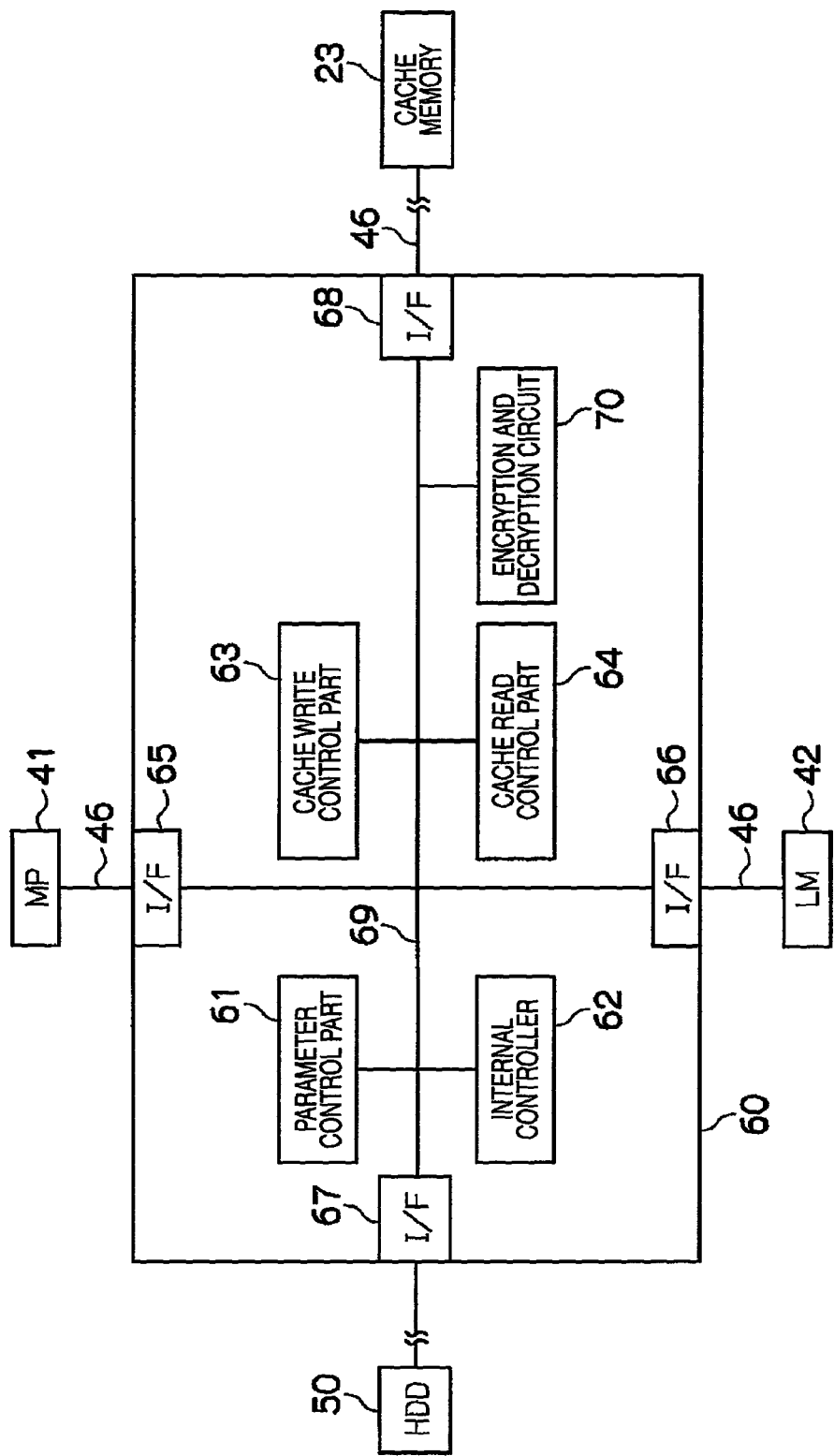
FIG. 3 is a block diagram for explaining the constitution of a fiber channel adapter module shown in FIG. 2.

FIG. 3 is a block diagram for explaining the constitution of the fibre channel adapter module shown in FIG. 2. As shown in FIG. 3, the FCA 60 includes a parameter control part 61, an internal controller 62, a cache read control part 63, a cache write control part 64 and a plurality of interfaces 65 to 68. The parameter control part 61, the internal controller 62, the cache read control part 63, the cache write control part 64 and the plurality of interfaces 65 to 68 are connected with each other via an internal bus 69. The internal bus 69 is connected to the MP 41 via the interface 65 and the internal bus 46, is connected to the LM 42 via the interface 66 and the internal bus 46, is connected to the predetermined HDD 50 via the interface 67, and is connected to the cache memory 23 via the interface 68 and the internal bus 46.

In the FCA 60 of the encryption disk adapter 40, further, an encryption and decryption circuit 70 for imparting an encryption/decryption function to the FCA 60 is connected to the internal bus 69. In this manner, by adding the encryption and decryption circuit 70 to the conventional FCA having no encryption/decryption function, it is possible to replace the disk adapter with the encryption disk adapter.

The encryption and decryption circuit 70 encrypts the data which is inputted from the cache memory 23 but is not yet outputted to the HDD 50 and also decrypts the data which is inputted from the HDD 50 but is not yet outputted to the cache memory 23. In this manner, for example, write data which is transmitted from the host computer 10 and is stored in the cache memory 23 is encrypted in the disk adapter 40 and is stored in the HDD 50. Accordingly, compared with a case in which the write data is encrypted in the host computer 10, it is possible to reduce a load imposed on the business application program in the host computer 10. Further, compared with a case in which the write data is encrypted by the communication network 11 between the host computer 10 and the storage device 20, throughput of the whole storage system 1 can be enhanced.

In this embodiment, the encryption and the decryption are performed using the data encryption key. However, the present invention is not limited to such constitution, and a data decryption key different from the data encryption key may be used in decrypting the data.

The internal controller 62 is provided for controlling an operation of reading and writing data between the cache memory 23 and the HDD 50 in the inside of the FCA 60. The parameter control part 61 is provided for setting parameters corresponding to physical addresses of the read data and the write data stored in the cache memory 23 to the cache read control part 64 and the cache write control part 63.

For example, in writing the data in the HDD 50 from the cache memory 23 (hereinafter, referred to as destaging), when the transfer permission information of data is inputted from the HDD 50, the internal controller 62 of the FCA 60 instructs the parameter control part 61 to read a parameter from the LM 42. The parameter control part 61 outputs the read parameter to the cache read control part 64.

The internal controller 62 instructs the cache read control part 64 to read data at a targeted address of the cache memory 23 based on the parameter. Further, the internal controller 62 instructs the cache read control part 64 to output the data read from the cache memory 23 to the encryption and decryption circuit 70.

The encryption and decryption circuit 70 applied encrypt processing to the inputted data by executing an encryption algorism of a predetermined method. The internal controller 62 instructs outputting of the encrypted data to the HDD 50 via the cache read control part 64.

On the other hand, in writing the data read from the HDD 50 to the cache memory 23 (hereinafter referred to as staging), the internal controller 62 decrypts the encrypted data in the encryption and decryption circuit 70 and, thereafter, in the same manner as the above-mentioned case, instructs the cache write control part 63 to output the decrypted data to the address of the cache memory 23 based on a parameter read from the LM 42 by the parameter control part 61.

Figure 4:
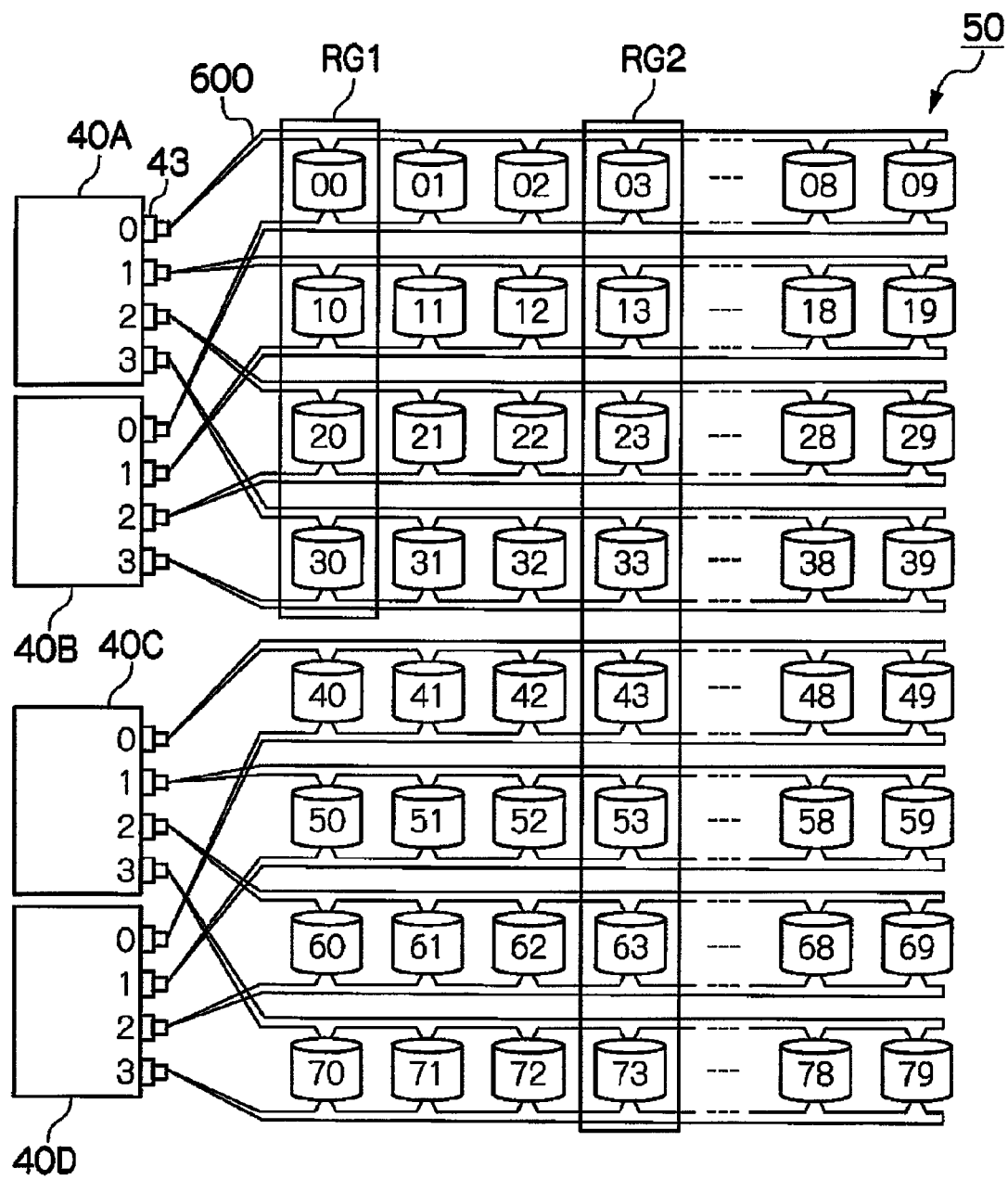
FIG. 4 is a block diagram for explaining a connection example of the disk adapter and an HDD shown in FIG. 1.

FIG. 4 is a block diagram for explaining an example of connection between the disk adapters and the HDDs shown in FIG. 1. As shown in FIG. 4, the respective disk adapters 40A to 40D are connected to the plurality of HDDs 50 via FC-AL 600 respectively constituted of a fiber channel, for example.

Each disk adapter 40A, 40B, 40C, 40D includes four ports 43. For example, the HDDs 50 (00 to 09) are connected to both of a pair of disk adapters 40A, 40B via ports (0) 43 using one FC-AL 600 loop. Due to such constitution, redundancy is realized with respect to the connection between the disk adapters and the HDDs. Other HDDs (10 to 79) 50, in the same manner, are also connected to both of a pair of the disk adapters and hence, redundancy is realized with respect to the connection between the disk adapters and the HDDs.

Further, in FIG. 4, for example, a RAID group (RG1) is constituted of four HDDs (00, 10, 20, 30) 50, and a RAID group (RG2) is constituted of eight HDDs (03, 13, 23, 33, 43, 53, 63, 73). That is, two RAID groups constituted of the RAID group (RG1) and the RAID group (RG2) correspond to the disk adapters 40A, 40B, while one RAID group constituted of the RAID group (RG2) corresponds to the disk adapters 40C, 40D. In this manner, one disk adapter 40 belongs to at least one RAID group.

Further, the number of the disk adapters 40 corresponding to the RAID group is determined based on the RAID configuration of the RAID group, that is, the number of the HDDs 50 which constitute the RAID group. For example, when the RAID group is constituted of four HDDs 50 as in the case of the RAID group (RG1), the corresponding disk adapters are two disk adapters constituted of disk adapters 40A, 40B, while when the RAID group is constituted of eight HDDs 50 as in the case of the RAID group (RG2), the corresponding disk adapters are four disk adapters consisting of disk adapters 40A to 40D. In this manner, at least one disk adapter 40 belongs to one RAID group.

Figure 5:
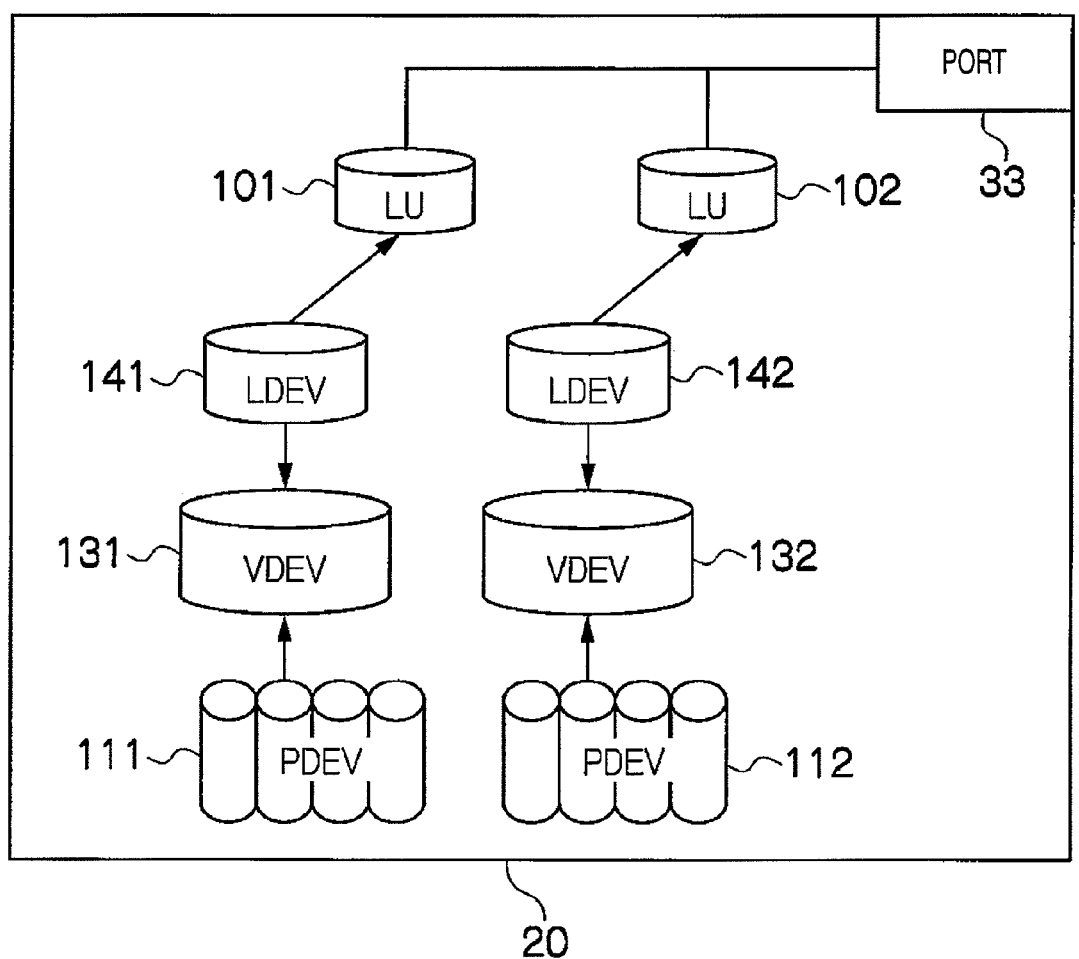
FIG. 5 is a block diagram for explaining the memory structure of the storage device shown in FIG. 1.

FIG. 5 is a block diagram for explaining the storing structure of the storage device shown in FIG. 1. The explanation is made assuming that FIG. 5 is a block diagram associated with any channel adapter out of the plurality of channel adapters provided in the storage device 20.

To a port 33 of the channel adapter 30, the host computer 10 is connected via the communication network 11 shown in FIG. 1. When the channel adapter 30 receives the data from the host computer 10, the port 33 of the channel adapter 30 functions as a target port.

LUs (Logical Unit) 101, 102 are entities in an SCSI target which executes an I/O command such as a write command or a read command and are mapped in the host computer 10 via the port 33. The host computer 10 recognizes the respective LUs and distinguishes the respective LUs from each other and issues an I/O command to the targeted LU.

The respective PDEVs (Physical Device) 111, 112 correspond to the respective HDDs 50. The physical storage tier which makes physical storage areas of the PDEVs and the logical storage areas of the LUs correspond to each other is constituted of a plurality of tiers, for example.

One logical tier is constituted of VDEVs (Virtual Devices) 121, 122 which correspond to the RAID group and another logical tier is constituted of LDEVs (Logical Device) 131, 132. Here, arrows shown in FIG. 5 indicate that the lower tier which is arranged at a proximal end of an arrow base belongs to the upper tier which is arranged at a distal end of an arrow.

One VDEV is constituted of a plurality of HDD 50 forming the RAID group, that is, is constituted of a plurality of PDEV. The LDEV is set as a stage below each VEDV and is defined by dividing the VDEV by a fixed length, for example. In FIG. 5, the LDEV 141 corresponds to the VDEV 131 and the LDEV 142 corresponds to the VDEV 132 respectively.

Here, when the host computer 10 is of an open system, the LDEV is mapped in the LU, and the host computer 10 accesses the desired LDEV by designating or specifying the LUN (Logical Unit Number) and the logical block address. In FIG. 5, the LDEV 141 is mapped in the LU 101 and the LDEV 142 is mapped in the LU 102 respectively. Further, when the host computer 10 is of a main frame system, the host computer 10 directly recognizes the LDEV.

The respective LU allows the connection of at least one LDEV thereto, and makes one LU associated with the plurality of LDEV, it is possible to virtually enlarge the storage area of the LU.

The corresponding relationship among the port, the LU, the LDEV, the VDEV and the PDEV is established by the management terminal 13 which is connected to the SVP 22 via the network 12, for example. This mapping is registered in the shared memory 24 by the SVP 22 as the RAID group management table 300 or the encryption management table 400 described later, for example.

Next, tables which are stored in the shared memory 24 are explained in conjunction with FIG. 6 to FIG. 9.

FIG. 6 is a constitutional view for explaining one example of a disk adapter management table shown in FIG. 1. The disk adapter management table 200 is provided for managing the disk adapter 40 provided to the storage system 1. The disk adapter management table 200 has respective rows (records) thereof registered in disk adapter registration processing in step S100 described later, for example. Further, the disk adapter management table 200 includes a DKA-ID column 200A and a DKA kind column 200B.

In the DKA-ID column 200A, an identifier which can univocally identify the disk adapter 40 in the storage system 1, for example, the disk adapter number, is stored. In the DKA kind column 200B, a kind of the disk adapter 40 corresponding to the identifier stored in the DKA-ID column 200A, for example, "compatible with encryption" indicating that the disk adapter 40 is provided with the encryption and decryption circuit 70 or "incompatible with encryption" indicating that the disk adapter 40 is not provided with the encryption and decryption circuit 70 is stored.

FIG. 7 is a constitutional view for explaining one example of the RAID group management table shown in FIG. 1. The RAID group management table 300 is provided for managing the RAID group constituted of a plurality of HDDs 50. The RAID group management table 300 is constituted of an RG-ID column 300A, an RG configuration column 300B and a DKA-ID column 300C.

In the RG-ID column 300A, an identifier which can univocally identify the RAID group in the storage system 1, for example, the RAID group number, is stored. In the RG constitution column 300B, a constitutional kind of the RAID group corresponding to the identifier stored in the RG-ID column 300A, for example, "3D+1P", "2D+2D", "7D+1P" and the like are stored. In the DKA-ID column 300C, at least one disk adapter number (identifier) is stored with respect to the disk adapter 40 which belongs to the RAID group having the RAID group number (identifier) stored in the RG-ID column 300A.

FIG. 8 is a constitutional view for explaining one example of the encryption management table shown in FIG. 1. The encryption management table 400 is provided for managing whether or not data to be written in the HDD 50 is encrypted. The adapter management table 200 has respective rows (records) thereof registered by the encryption setting processing in step S600 described later, for example. Further, the encryption management table 400 is constituted of an RG-ID column 400A, the encryption setting column 400B and the LDEV-ID column 400C.

In the RG-ID column 400A, an identifier which can univocally identify the RAID group in the storage system 1, for example, the RAID group number, is stored. In the encryption setting column 400B, an encryption state indicative of whether or not data is encrypted with respect to the RAID group corresponding to the identifier stored in the RG-ID column 400A, for example, "ON" indicative of encryption of data or "OFF" indicative of non-encryption of data are stored. In the LDEV-ID column 400C, a plurality of identifiers which can univocally identify the LDEV in the storage system 1, for example, a plurality of LDEV numbers is stored, wherein the LDEV corresponds to the RAID group having the RAID group numbers (identifiers) stored in the RG-ID column 400A. In the explanation made hereinafter, setting of data encryption is simply referred to as setting of encryption and non-setting of data encryption is simply referred to as non-setting of encryption.

FIG. 9 is a constitutional view for explaining one example of the external backup information table 500 shown in FIG. 1. The external backup information table 500 is provided for storing a backup file containing data encryption key which is backed up by an external device. The external backup information table 500 has respective rows (records) thereof registered in external backup processing in step S300 described later, for example. Further, the external backup information table 500 is constituted of a device manufacturing number column 500A, an external conversion encryption key column 500B and a hash value column 500C.

In the device manufacturing number column 500A, a manufacturing number of the external device which becomes the backup destination of the data encryption key, for example, the manufacturing number of the management terminal 13 is stored. In the external conversion encryption key column 500B, an external conversion encryption key described later which is generated by the data encryption key is stored. In the hash value column 500C, a hash value which corresponds to the external conversion encryption key stored in the external conversion encryption key column 500B is stored.

In this embodiment, even when a plurality of encryption disk adapters 40 is present in the storage device 20, one data encryption key is used in common by the respective encryption disk adapters 40. However, the present invention is not limited to such a case. That is, the data encryption keys which differ from each other for respective encryption disk adapters 40 may be used, or the storage device 20 may be divided into a plurality of partitions and the data encryption keys which differ from each other for respective partitions may be used. In such a case, a plurality of rows (records) is registered in the external backup information table 500.

Next, the manner of operation of the storage device 20 is explained in conjunction with FIG. 10 to FIG. 23.

Figure 10:
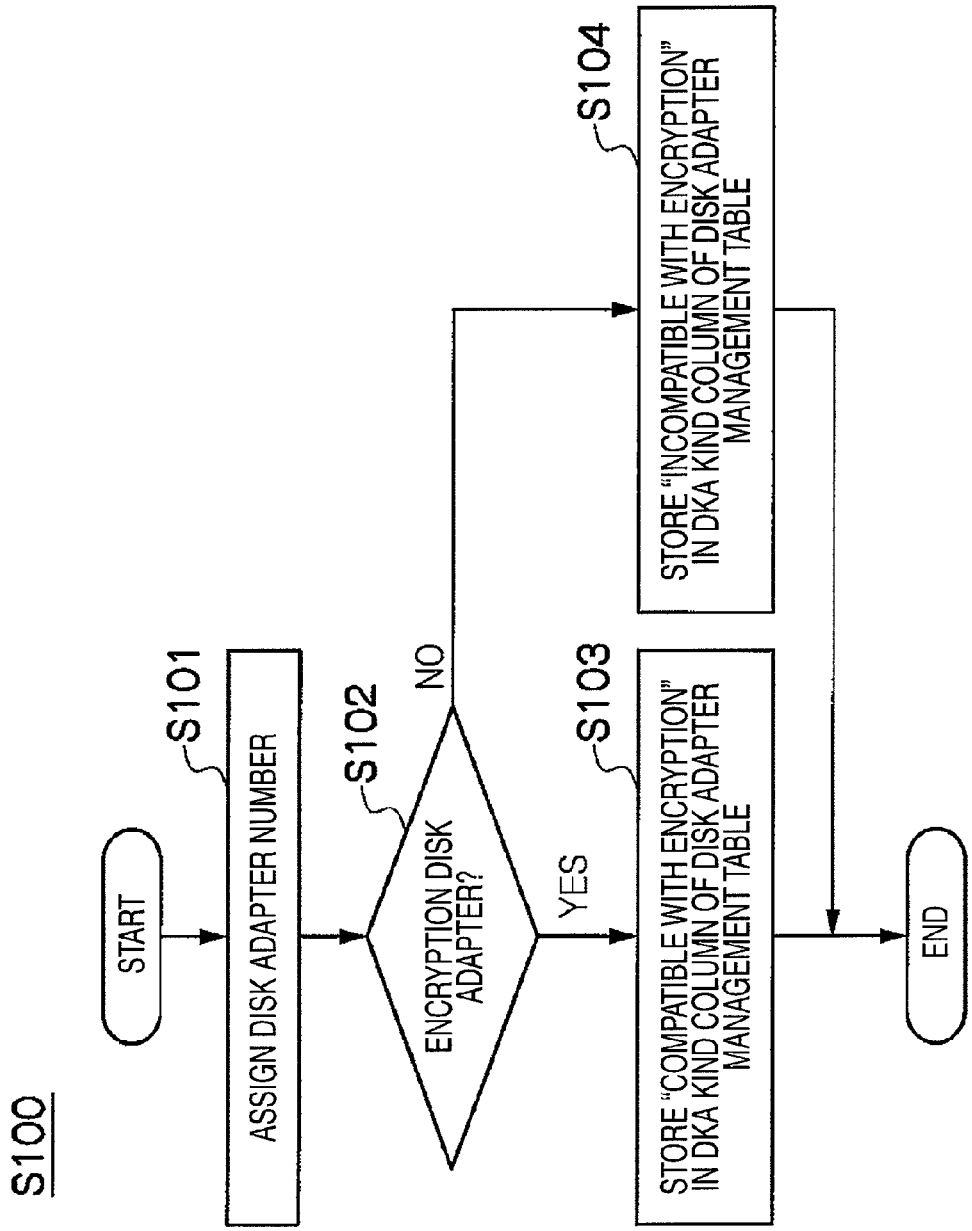
FIG. 10 is a flowchart for explaining the manner of operation for registering the disk adapter shown in FIG. 1.

FIG. 10 is a flowchart for explaining the manner of operation for registering the disk adapters shown in FIG. 1. For example, when the disk adapter 40 is newly mounted on the storage device 20, the SVP 22 executes disk adapter registration processing in step S100 shown in FIG. 10.

That is, the SVP 22 collects predetermined information from all disk adapters 40, and assign a disk adapter number (identifier) to the newly mounted disk adapter 40 based on the collected predetermined information (S101). Next, the SVP 22 determines whether or not the newly mounted disk adapter 40 is the encryption disk adapter based on the collected predetermined information (S102). Here, SVP 22 determines that the newly mounted disk adapter 40 is the encryption disk adapter when the disk adapter 40 includes an encryption and decryption circuit 70, and determines that the newly mounted disk adapter 40 is not the encryption disk adapter when the disk adapter 40 does not include the encryption and decryption circuit 70.

When the newly mounted disk adapter 40 is the encryption disk adapter as a result of the determination in step S102, the SVP 22 stores the disk adapter number (identifier) assigned in the processing in step S101 in the DKA-ID column 200A of the disk adapter management table 200 stored in the common memory 24 and, at the same time, stores "compatible with encryption" in the DKA kind column 200B of the disk adapter management table 200 (step S103), and registers the row (record). After executing processing in step S103, the SVP 22 finishes the disk adapter registration processing in step S100.

On the other hand, when it is determined that the disk adapter 40 does not satisfy "compatible with encryption" as the result of the determination in step S102, the SVP 22 stores the disk adapter number (identifier) of the disk adapter 40 assigned in the processing in step S101 in the DKA-ID column 200A of the disk adapter management table 200 stored in the common memory 24 and, at the same time, stores "incompatible with encryption" in the DKA kind column 200B of the disk adapter management table 200 (step S104), and the row (record) is added. After executing processing in step S104, the SVP 22 finishes the disk adapter registration processing in step S100.

In this embodiment, the SVP 22 is configured to assign the disk adapter number (identifier) of the disk adapter 40. However, the present invention is not limited to such processing and the disk adapter number (identifier) of the disk adapter 40 may be inputted from the management terminal 13. Further, the disk adapter registration processing in step S100 is not limited to the case in which the disk adapter 40 is newly mounted. That is, the disk adapter registration processing may be executed at the time of performing the initial registration of the disk adapter 40 or may be executed when the encryption and decryption circuit 70 is added to the existing disk adapter 40.

Figure 11:
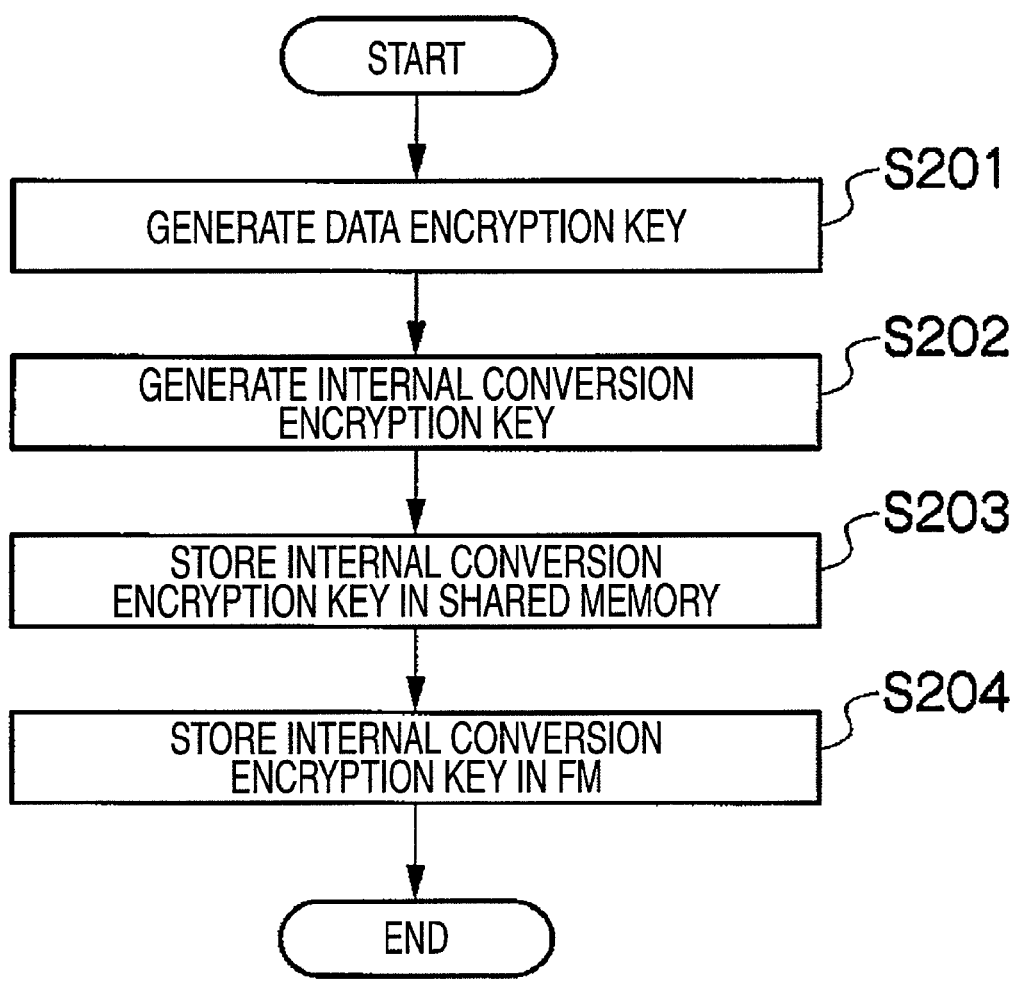
FIG. 11 is a flowchart for explaining the manner of operation for backing up a data encryption key in the inside of the storage device.

FIG. 11 is a flowchart for explaining the manner of operation for backing up the data encryption key in the storage device. For example, when the request for generation of the above-mentioned data encryption key is inputted to the encryption-corresponding disk adapter 40 from the SVP 22, the MP 41 of the encryption-corresponding disk adapter 40 executes the internal backup processing in step S200 shown in FIG. 1.

That is, the MP 41 generates random numbers by making use of a random number generating function thereof, and generates the random numbers as the data encryption key (S201). Although the data encryption key is formed using the random number generated by making use of the random number generating function in this embodiment, the present invention is not limited to such processing and the data encryption key may be formed by other method.

Next, the MP 41 encrypts the data encryption key generated in the processing in step S201 using an internal encryption key stored in the LM 42 and generates an internal conversion encryption key (S202). Next, the MP 41 stores the internal conversion encryption key generated in step S202 in the shared memory 24 (S203). Although the internal conversion encryption key is generated and is stored in the shared memory 24 for increasing security in this embodiment, the present invention is not limited to such processing, and the data encryption key may be directly stored in the shared memory 24.

Along with such processing, the MP 41 stores the internal conversion encryption key generated in the processing in step S202 in the FM 44 arranged in the own encryption corresponding disk adapter 40 (S204). Due to such processing, the internal conversion encryption key (data encryption key) is backed up by a non-volatile medium in the storage device 20. Accordingly, even when the internal conversion encryption key stored in the shared memory 24 is lost, the internal conversion encryption key can be restored from the FM 44 thus enabling the safe management of the data encryption key used for the encryption of data.

After processing in step S204, the MP 41 finishes the internal backup processing S200.

Figure 12:
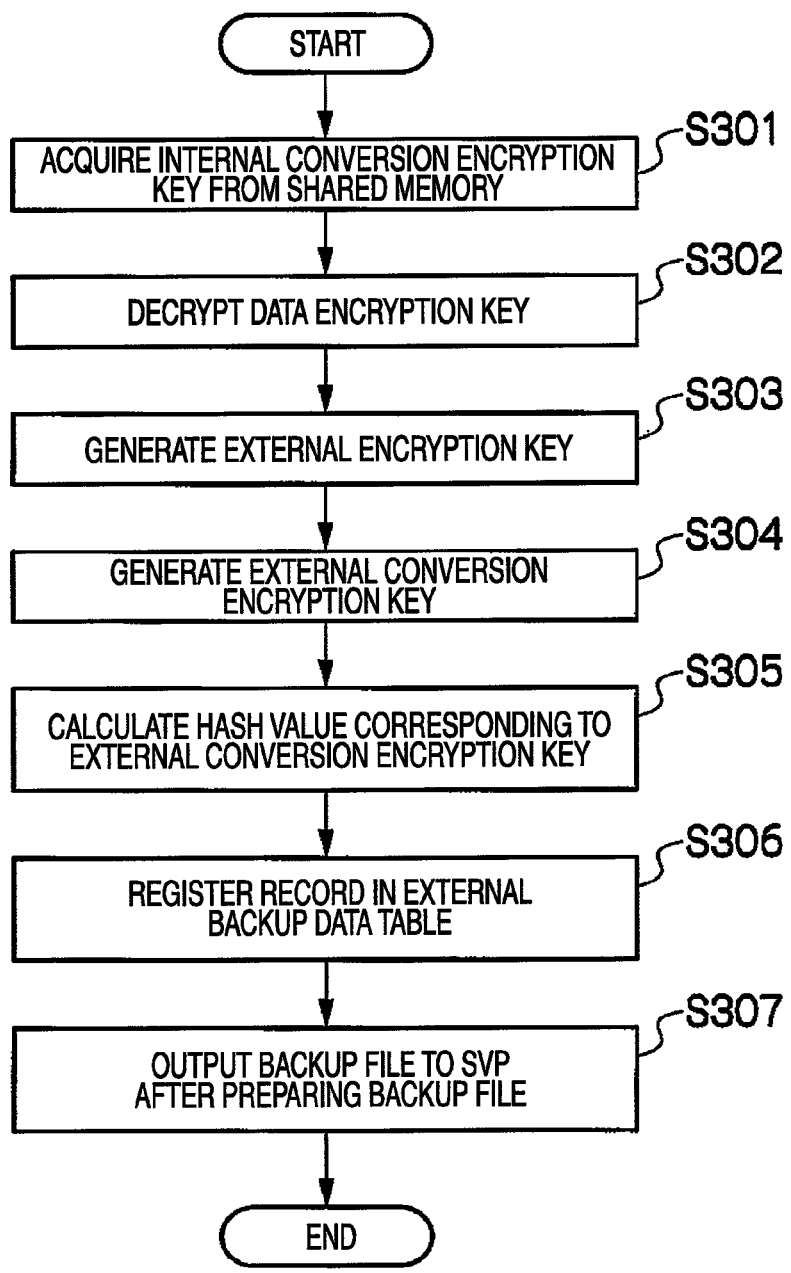
FIG. 12 is a flowchart for explaining the manner of operation for backing up the data encryption key outside the storage device.

FIG. 12 is a flowchart for explaining the manner of operation for backing up the data encryption key outside the storage device. For example, when an external backup request of the data encryption key which designates a password is transmitted from the management terminal 13 via the network 12, the SVP 22 stores the received external backup request of the data encryption key in the shared memory 24. When the encryption disk adapter 40 finds the unprocessed external backup request by looking up the shared memory 24, the MP 41 of the encryption disk adapter 40 executes the external backup processing in step S300 shown in FIG. 12.

That is, the MP 41 of the encryption disk adapter 40 acquires the internal conversion encryption key stored in the shared memory 24 (S301) and decrypts the acquired internal conversion encryption key into the data encryption key using the internal encryption key stored in the LM 42 (S302).

Next, the MP 41 generates an external encryption key based on the designated password (S303), encrypts the data encryption key decrypted in the processing in step S302 using the external encryption key generated in the processing in step S303, and generates an external conversion encryption key (S304). Next, the MP 41 calculates a hash value corresponding to the external conversion encryption key using a hash function (S305). Subsequently, the MP 41 stores the manufacturing number of the management terminal 13 which transmits the external backup request in a device manufacturing number column 500A of the external backup information table 500 stored in the shared memory 24, stores the external conversion encryption key generated in the processing in step S304 in an external conversion encryption key column 500B of the external backup information table 500, and stores the hash value calculated in the processing in step S305 in a hash value column 500C and registers rows (records) thereof (S306).

Next, the MP 41 prepares a backup file containing the manufacturing number, the external conversion encryption key and the hash value of the management terminal 13, and outputs the backup file to the SVP 22 (S307), and the MP 41 finishes the external backup processing S300. The backup file inputted to the SVP 22 is transmitted to the management terminal 13 via the network 12. Due to such processing, the external conversion encryption key (data encryption key) is backed up by the management terminal 13 outside the storage device 20. Accordingly, even when the external conversion encryption key in the storage device 20 is lost, the external conversion encryption key can be restored from the management terminal 13 which constitutes the external device and hence, the data encryption key used for the encryption of data can be safely managed.

In this embodiment, for increasing the security, the external conversion encryption key is generated and is stored in the external backup information table 500 and, at the same time, is backed up by the external device. However, the present invention is not limited to such processing, and the data encryption key may be directly stored in the external backup information table 500 and, at the same time, may be backed up by the external device. In such a case, a hash value corresponding to the data encryption key is calculated. Further, for enhancing the security, in addition to the external conversion encryption key, the manufacturing number and the hash value of the management terminal 13 are stored in the external backup information table 500 and, at the same time, are backed up by the external device. However, the present invention is not limited to such processing and neither one of the manufacturing number and the hash value of the management terminal 13 may be used or either one of the manufacturing number and the hash value of the management terminal 13 may be used.

Here, when a plurality of encryption disk adapters 40 is provided in the storage device 20, the MP 41 of the first encryption disk adapter 40 which finds the unprocessed external backup request by looking up the shared memory 24 may execute the external backup processing in step S300.

Figure 13:
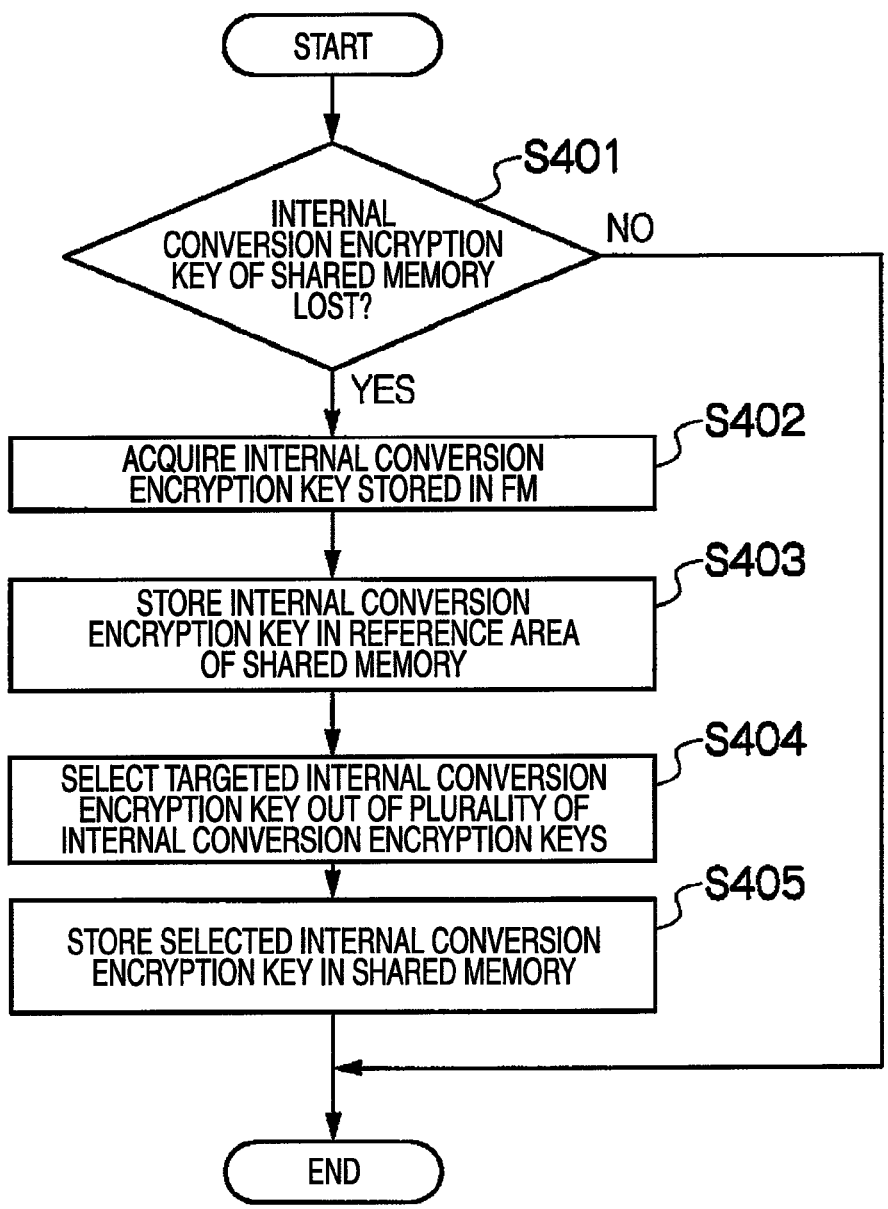
FIG. 13 is a flowchart for explaining the manner of operation for restoring the data encryption key in the inside of the storage device.

FIG. 13 is a flowchart for explaining the manner of operation for restoring the data encryption key from the inside of the storage device 20. In general, the shared memory 24 is formed of a volatile memory and hence, unless a battery or the like is provided to the shared memory 24, when a power source of the storage device 20 is cut off or the supply of electricity is interrupted, the data stored in the shared memory 24 is lost. Accordingly, when the electricity is supplied to the storage device 20 so that the operation of the storage device 20 is started, it is necessary to confirm whether or not the internal conversion encryption key in the shared memory 24 is lost. For example, when the operation of the storage device 20 is started, the MP 41 of the encryption disk adapter 40 executes the internal restoring processing S400 shown in FIG. 13.

That is, the MP 41 of the encryption disk adapter 40 determines whether or not the internal conversion encryption key is lost by looking up the shared memory 24 (S401). Here, whether or not the internal conversion encryption key of the shared memory 24 is lost is determined based on whether or not a response of uncollectible error is made using an ECC (Error Check and Correct) circuit or the like, for example.

When it is determined that the internal conversion encryption key is lost as a result of the determination in step S401, the MP 41 acquires the internal conversion encryption key stored in the FM 42 (S402). Next, the MP 41 stores the internal conversion encryption key acquired in step S402 in a reference area in the shared memory 24 (S403). Here, when a plurality of encryption disk adapters 40 is provided in the storage device 20, the processing in step S402 and in step S403 are executed by the MP 41 of all encryption disk adapters 40.

Next, the MP 41 of any one of encryption disk adapters 40 looks up the reference area in the shared memory 24, and selects the targeted internal conversion encryption key out of the plurality of internal conversion encryption keys (S404) Here, as a method for selecting the targeted internal conversion encryption key, a method which adopts decision by a majority or a method which selects a most updated internal conversion encryption key in view of time in which the internal conversion encryption key is generated is used. Further, when only one encryption disk adapter 40 is provided in the storage device 20, the processing in step S404 becomes unnecessary.

Next, the MP 41 stores the internal conversion encryption key which is selected in the processing in step S404 in the shared memory 24 (S405). Due to such processing, the internal conversion encryption key (data encryption key) in the storage device 20 is restored in the shared memory 24.

After the processing in step S405 is executed, the MP 41 finishes the internal restoring processing S400.

On the other hand, when the internal conversion encryption key is stored as a result of the determination in step S401, it is unnecessary to restore the internal conversion encryption key and hence, the MP 41 finishes the internal restoring processing S400 without performing any processing.

Figure 14:
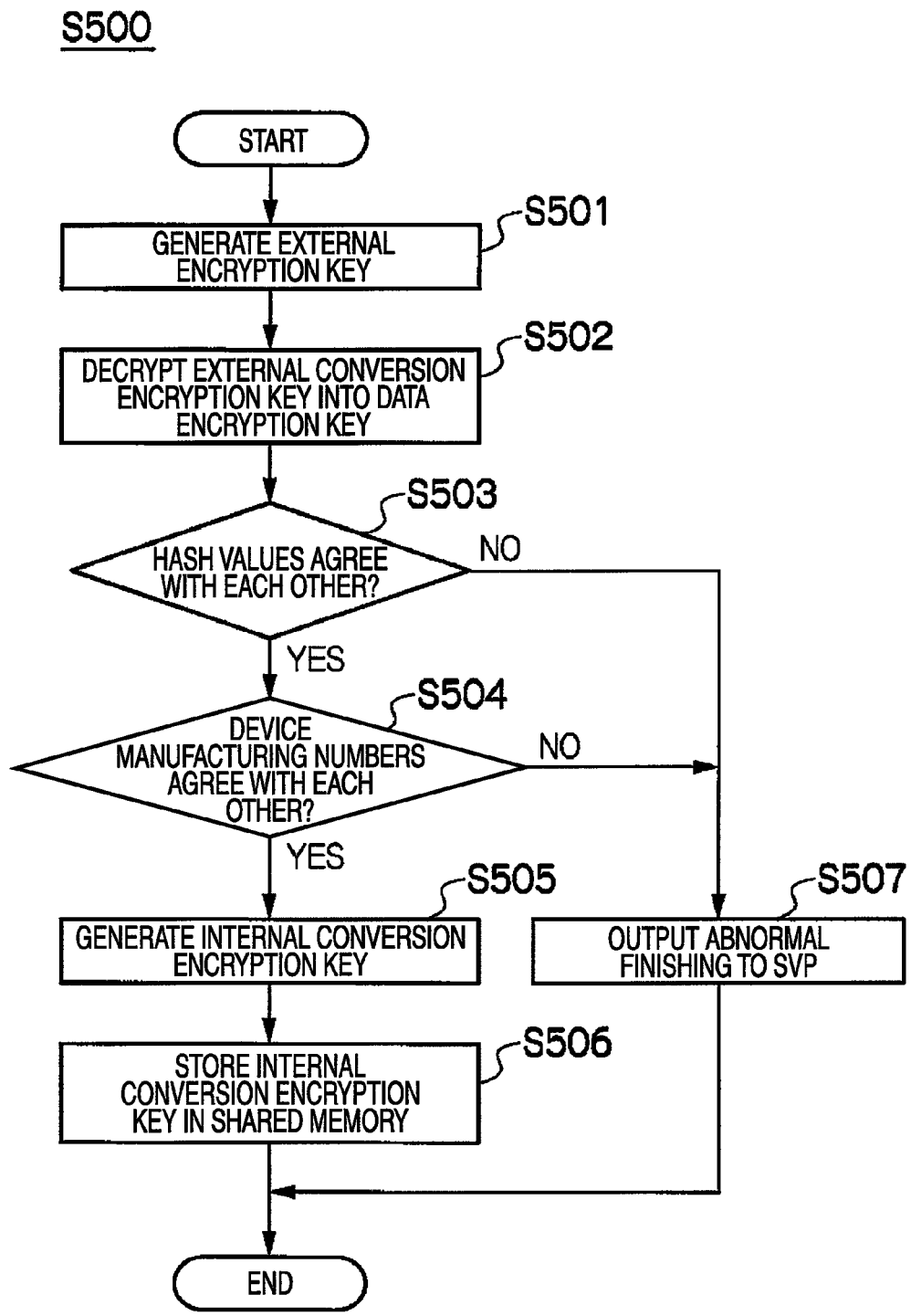
FIG. 14 is a flowchart for explaining the manner of operation for restoring the data encryption key outside the storage device.

FIG. 14 is a flowchart for explaining the manner of operation for restoring the data encryption key outside the storage device. That is, when the backup file and the external restore request of the data encryption key which designates the password is transmitted from the management terminal 13 via the network 12, the SVP 22 stores the received external restore request in the shared memory 24 and, at the same time, stores the backup file in the cache memory 23. When the encryption disk adapter 40 finds the unprocessed external restore request by looking up the shared memory 24, the MP 41 of the encryption disk adapter 40 executes the external restore processing in step S500 shown in FIG. 14.

That is, the MP 41 of the encryption disk adapter 40 generates the external encryption key based on the designated password (S501). Next, the MP 41 decrypts the external conversion encryption key contained in the backup file stored in the cache memory 23 into the data encryption key using the external encryption key generated in the processing in step S501 (S502).

Next, the MP 41 determines, in the external backup information table 500 stored in the shared memory 24, whether or not a hash value contained in the backup file stored in the cache memory 23 agrees with a value stored in the hash value column 500C (S503). Accordingly, it is possible to detect the breaking of the external conversion encryption key (data encryption key).

When the hash value agrees with the stored value as a result of the determination in step S503, it is determined whether or not the device manufacturing number contained in the backup file stored in the cache memory 23 and the manufacturing number stored in the device manufacturing number column 500A agree with each other (S504). Due to such processing, an error of the external device which constitutes a restore source can be detected.

When the device manufacturing numbers agree with each other as a result of the determination in step S504, the external conversion encryption key contained in the backup file is considered proper, and the MP 41 encrypts the data encryption key decrypted in the processing in step S502 using the internal encryption key stored in the LM 42 thus generating the internal conversion encryption key (S505). Next, the MP 41 stores the internal conversion encryption key generated in the processing in step S505 in the shared memory 24 (S506). Due to such processing, the external conversion encryption key (data encryption key) outside the storage device 20 is restored in the shared memory 24.

After processing in step S506 is executed, the MP 41 outputs normal finishing to the SVP thus finishing the external restore processing S500. The SVP 22 transmits a response indicative of normal finishing of a received external restore request to the management terminal 13 via the network 12.

On the other hand, when the hash value does not agree with the stored value as the result of determination in step S503 or when the device manufacturing numbers do not agree with each other as the result of determination in step S504, the MP 41 outputs abnormal finishing to the SVP (S507), and the MP 41 finishes the external restore processing S500. The SVP 22 transmits a response indicative of abnormal finishing of the received external restore request to the management terminal 13 via the network 12.

Here, when the plurality of encryption disk adapters 40 is present in the storage device 20, in the same manner as the above-mentioned external backup processing S300, the MP 41 of the first encryption disk adapter 40 which finds the unprocessed external restore request by looking up the shared memory 24 may execute the external restore processing S500.

Figure 15:
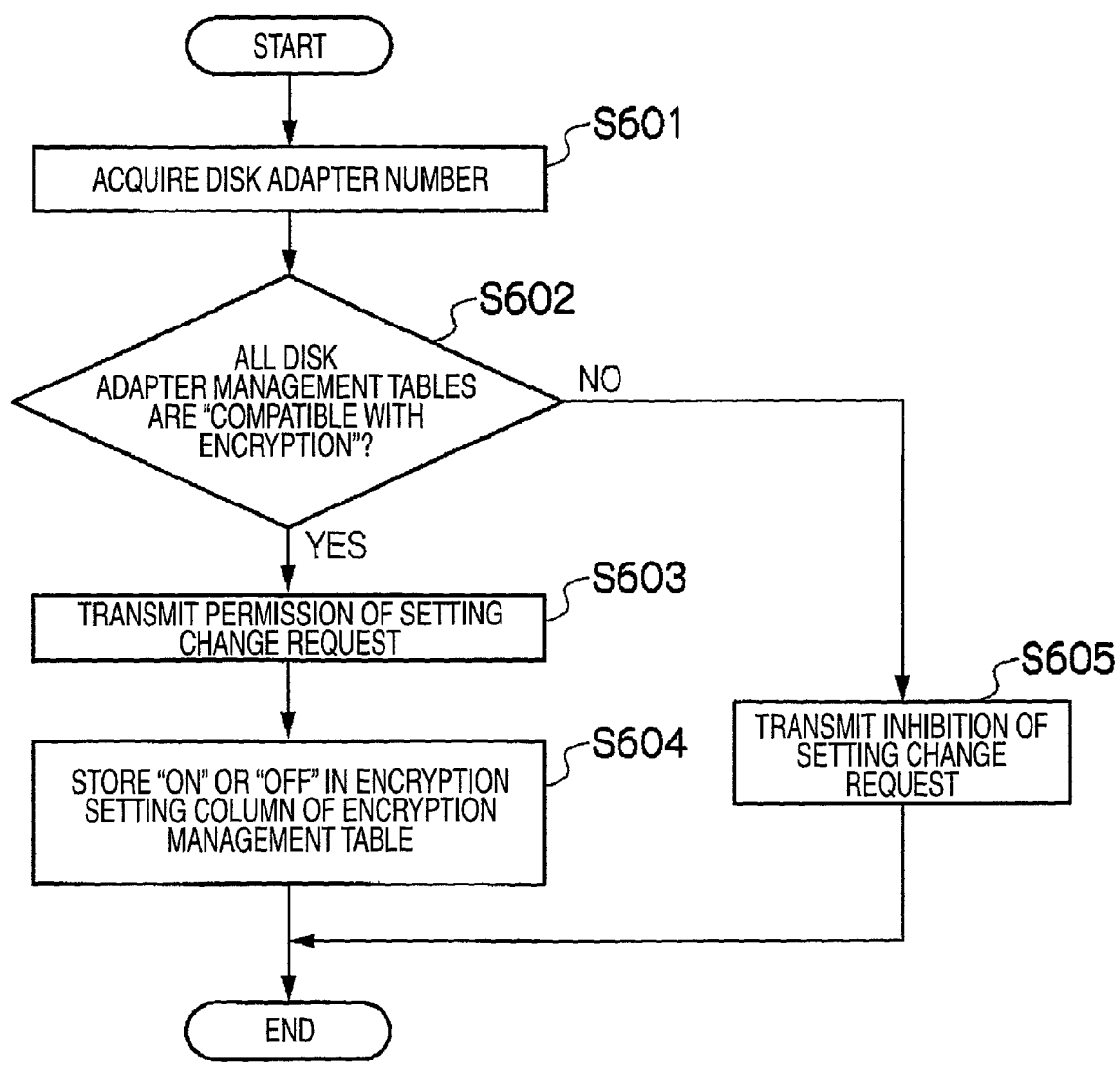
FIG. 15 is a flowchart for explaining the manner of operation for setting an encryption state of the disk adapter shown in FIG. 1.

FIG. 15 is a flowchart for explaining the manner of operation for setting the encryption state of the disk adapter shown in FIG. 1. For example, when a setting change request which designates the RAID group number (identifier) is transmitted to the SVP 22 from the management terminal 13 via the network 12, the SVP 22 executes encryption setting processing in step S600 shown in FIG. 15.

That is, the SVP 22 which receives the setting change request, in the RAID group management table 300 stored in the shared memory 24, reads a row (record) in which the designated RAID group number (identifier) is stored in the RG-ID column 300A, and acquires the disk adapter number (identifier) stored in the DKA-ID column 300C of the row (record) (S601). Here, the plurality of HDDs 50 which constitutes the RAID group is connected to at least one disk adapter 40 and hence, usually, the plurality of disk adapter numbers (identifiers) is acquired in the processing in step S601.

Next, the SVP 22, in the disk adapter management table 200 stored in the shared memory 24, reads all rows (records) in which the disk adapter numbers (identifiers) acquired in the processing in step S601 are stored in the DKA-ID column 200A, and determines whether or not "compatible with encryption" is stored in all DKA-kind columns 200B of the rows (records) (S602).

When "compatible with encryption" is stored in all DKA-kind columns 200B of the rows (records) as a result of the determination in step S602, the SVP 22 transmits a response indicative of the permission of the transmitted setting change request to the management terminal 13 via the network 12 (S603).

The management terminal 13 which receives the response indicative of the permission of the transmitted setting change request displays a predetermined screen which can designate the encryption setting with respect to the firstly designated RAID group as either "ON" or "OFF". An administrator designates the encryption state with respect to the RAID group, and the management terminal 13 transmits the RAID group number (identifier) and the encryption setting request which designates the encryption setting via the network 12.

The SVP 22 which receives the encryption setting request, in the encryption management table 400 stored in the shared memory 24, reads a row (record) in which the designated RAID group number (identifier) is stored in the RG-ID column 400A, stores an encryption state designated in the encryption setting column 400B of the row (record), that is, "ON" or "OFF" thus updating the row (record), and writes the updated row (record) in the encryption management table 400 stored in the shared memory 24 (S604). In this manner, by setting the encryption state with respect to the RAID group, the HDDs 50 which constitute the RAID group are stored by only either one of the processing in which the data is encrypted and stored or the processing in which the data is stored without encryption. Due to such processing, there is no possibility that an encryption area in which the encrypted data is stored and a non-encryption area in which non-encrypted data is stored are provided in mixture in one HDD 50. Accordingly, it is possible to prevent leaking of data attributed to stealing or taking out of the HDD 50.

After the processing in step S604 is executed, the SVP 22 finishes the encryption setting processing S600.

On the other hand, when "compatible with encryption" is not stored in at least one of DKA-kind columns 200B of the rows (records) as a result of the determination in step S602, the SVP 22 transmits a response indicative of the inhibition of the transmitted setting change request to the management terminal 13 via the network 12 (S605). After the processing in step S605 is executed, the SVP 22 finishes the encryption setting processing S600.

The management terminal 13 which receives the response indicative of inhibition of the setting change request displays a predetermined screen which displays that the encryption state with respect to the firstly designated RAID group is not changeable.

After the processing in step S600 is executed, the SVP 22 can display the encryption state for every LDEV.

That is, for example, the encryption state request designating the LDEV number (identifier) is transmitted from the management terminal 13 via the network 12, the SVP 22, in the encryption management table 400 stored in the shared memory 24, read a row (record) in which the designated LDEV number (identifier) is stored in the LDEV-ID column 400C. Next, the SVP 22 transmits the encryption state stored in the encryption setting column 400B of the row (record) to the management terminal 13 via the network 12 as a response. The management terminal 13 displays the encryption state of the designated LDEV on a monitor or the like. In this manner, the encryption state of the LDEV which belongs to the RAID group can be displayed based on the encryption state set in the RAID group and hence, for example, in performing an operation such as date migration or data copying described later, the administrator can be informed of the encryption state for every LDEV.

Figure 16:
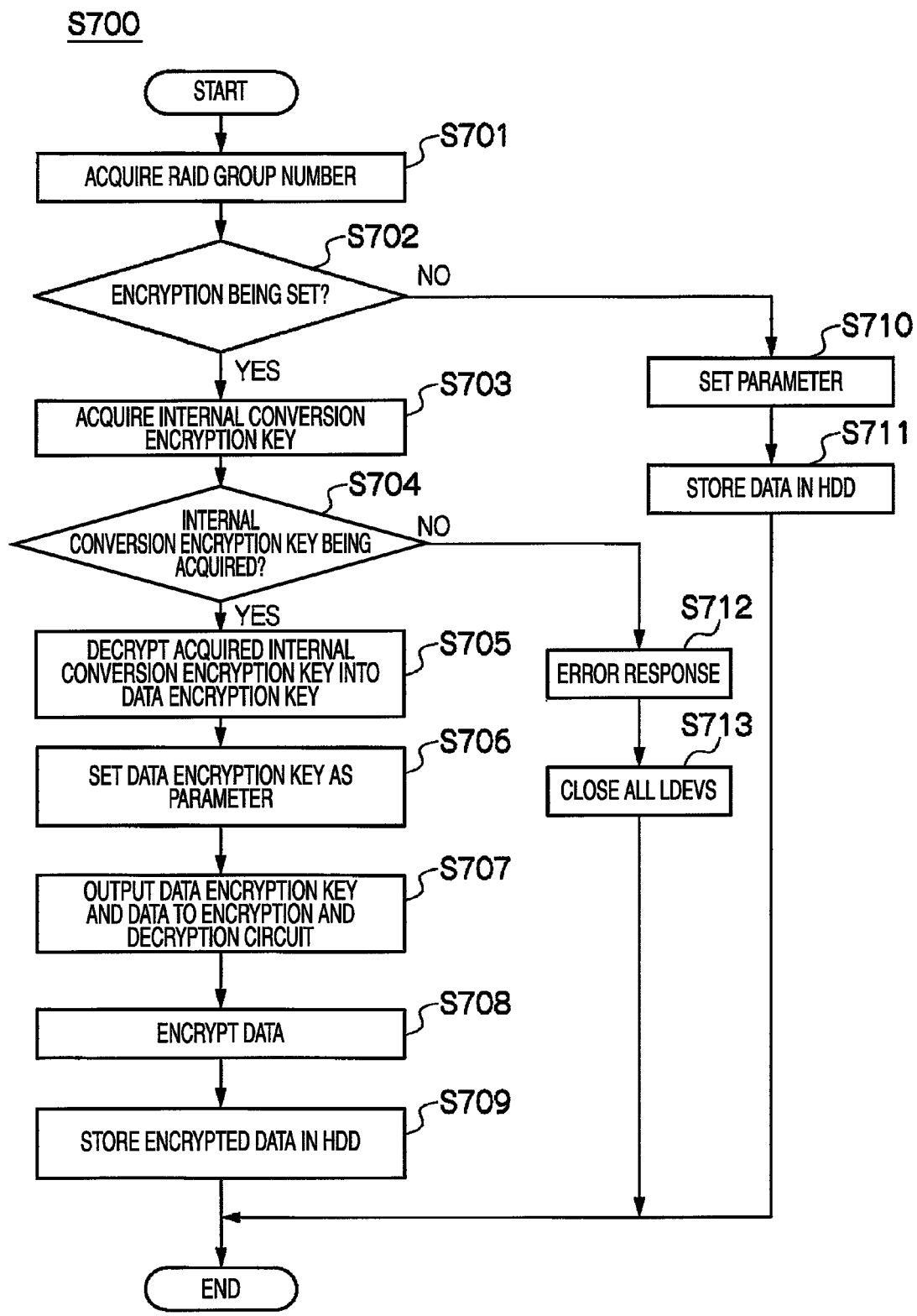
FIG. 16 is a flowchart for explaining the manner of operation of the disk adapter shown in FIG. 1 for writing data in the HDD.

FIG. 16 is a flowchart for explaining the manner of operation that the disk adapter shown in FIG. 1 writes data in the HDD. For example, when write data or a write command is transmitted from a host computer 10 via a communication network 11, as described previously, the channel adapter 30 stores the received write data in the cache memory 23 and, at the same time, stores the received write command in the shared memory 24. The disk adapter 40 looks up the shared memory 24 and, when the write command stored in the shared memory 24 is a write command to the disk adapter per se, that is, when a logical address designated by the write command is converted into a physical address and the converted physical address corresponds to the connected HDD 50, the MP 41 of the disk adapter 40 executes the write processing S700 shown in FIG. 16.

That is, the MP 41, in the encryption management table 400 stored in the shared memory 24, reads a row (record) in which the LDEV number (identifier) of the LDEV which is the storing destination of the write data contained in the write command is stored in the LDEV-ID column 400C, and acquires the RAID group number (identifier) stored in the RG-ID column 400A of the row (record) (S701). Next, the MP 41, based on information stored in the encryption setting column 400B of the row (record), determines whether or not the encryption is set (S702). When the encryption setting column 400B assumes an "ON" state, it is determined that the encryption is set, while when the encryption setting column 400B assumes an "OFF" state, it is determined that the encryption is not set.

When the encryption is set as a result of determination in step S702, the MP 41 acquires the internal conversion encryption key stored in the shared memory 24 (S703). Next, the MP 41 determines whether or not the internal conversion encryption key is acquired (S704).

When the internal conversion encryption key is acquired as a result of determination in step S704, the MP 41 decrypts the acquired internal conversion encryption key into the data encryption key using the internal encryption key stored in the LM 42 (S705). Next, the MP 41 sets the data encryption key decrypted in processing in step S705 as a parameter, and stores the parameter in the LM 42 (S706).

Next, in the same manner as the previously described destaging, the internal controller 62 in the FCA 60 outputs an instruction to the parameter control part 61 or the like, and the parameter control part 61 outputs the parameter stored in the LM 42 to the cache read control part 64. Next, the internal controller 62 outputs an instruction to a cache read control part 64 or the like, and the cache read control part 64 outputs the data encryption key contained in the parameter inputted in the processing in step S707 and write data stored in the cache memory 23 in the encryption and decryption circuit 70 (S707).

The encryption and decryption circuit 70 encrypts the write data using the data encryption key (S708). Next, the encryption and decryption circuit 70 output the encrypted write data to the cache read control part 64, and the cache read control part 64 stores the inputted encrypted write data in the HDD 50 (S709). Due to such processing, the encrypted data is written in the HDD 50 based on the encryption state set in the RAID group.

After the processing in step S710 is executed, the MP 41 finishes the write processing S700.

On the other hand, when the encryption is not set as a result of determination in step S702, the MP 41 sets the predetermined parameter and stores the parameter in the LM 42 (S710).

Next, in the same manner as the above-described destaging, the internal controller 62 in the FCA 60 outputs an instruction to the parameter control part 61 and the like, and the parameter control part 61 outputs the parameter stored in the LM 42 in the cache read control part 64 and the like. Next, the internal controller 62 outputs an instruction to the cache read control part 64 and the like, and the cache read control part 64 stores the write data stored in the cache memory 23 in the HDD 50 based on the parameter inputted in the processing in step S712 (S711). Due to such processing, non-encrypted data is written in the HDD 50 based on an encrypted state set in the RAID group.

After the processing in step S711 is executed, the MP 41 finishes the write processing S700.

On the other hand, when the internal conversion encryption key is not acquired as a result of determination in step S704, the MP 41 responds to the host computer 10 which transmits a write command with a write error via the channel adapter 30 (S712). Next, the MP 41, in information which manages the LDEV stored in the shared memory 24, records information indicative of "closed" to all LDEV which belongs to the RAID group having the RAID group number (identifier) acquired in step S701 (S713). Due to such processing, the access to all LDEV belonging to the RAID group is inhibited.

After the processing in step S713 is executed, the MP 41 finishes the write processing S700.

The explanation has been made heretofore with respect to the example which stores the write data transmitted from the host computer 10 in the HDD 50. However, the present invention is not limited to such an example, and in destaging for writing the data stored in the cache memory 23 in the HDD 50, the write processing S700 is executed.

Figure 17:
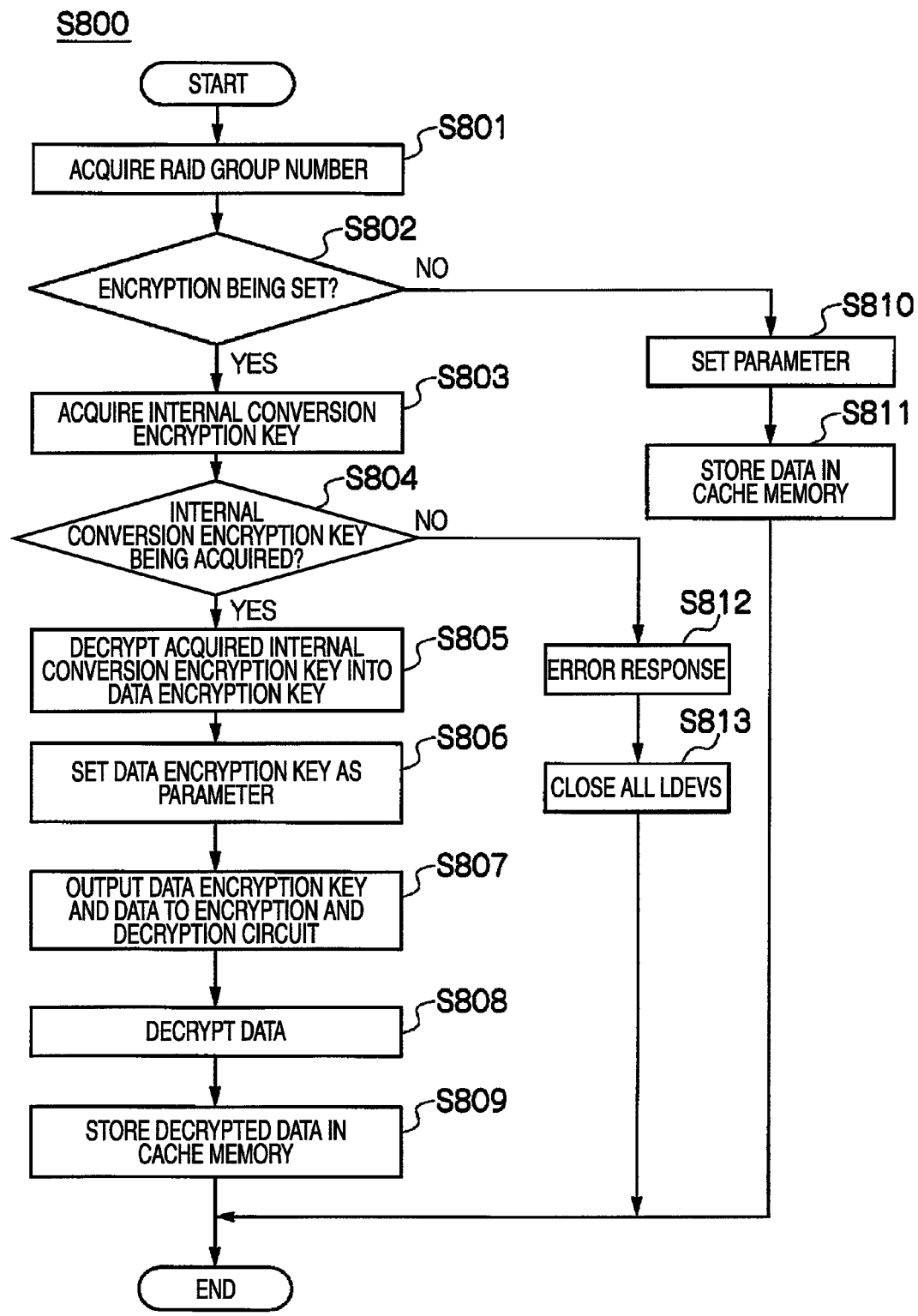
FIG. 17 is a flowchart for explaining the manner of operation of the disk adapter shown in FIG. 1 for reading data from the HDD.

FIG. 17 is a flowchart for explaining the manner of operation in which the disk adapter shown in FIG. 1 reads data from the HDD. For example, when the write command is transmitted from the host computer 10 via the communication network 11, as described previously, the channel adapter 30 stores a received read command in the shared memory 24. The disk adapter 40 looks up the shared memory 24 and, when the read command stored in the shared memory 24 is a read command to the disk adapter per se, that is, when a logical address designated by the read command is converted into a physical address and the converted physical address corresponds to the connected HDD 50, the MP 41 of the disk adapter 40 executes the read processing S800 shown in FIG. 17.

That is, the MP 41, in the encryption management table 400 stored in the shared memory 24, reads a row (record) in which the LDEV number (identifier) of the LDEV which is the storing destination of the targeted data contained in the read command is stored in the LDEV-ID column 400C, and acquires the RAID group number (identifier) stored in the RG-ID column 400A of the row (record) (S801). Next, the MP 41, based on information stored in the encryption setting column 400B of the row (record), determines whether or not the encryption is set (S802). When the encryption setting column 400B assumes an "ON" state, it is determined that the encryption is set, while when the encryption setting column 400B assumes an "OFF" state, it is determined that the encryption is not set.

When the encryption is set as a result of determination in step S802, the MP 41 acquires the internal conversion encryption key stored in the shared memory 24 (S803). Next, the MP 41 determines whether or not the internal conversion encryption key is acquired (S804).

When the internal conversion encryption key is acquired as a result of determination in step S804, the MP 41 decrypts the acquired internal conversion encryption key into the data encryption key using the internal encryption key stored in the LM 42 (S805). Next, the MP 41 sets the data encryption key decrypted in processing in step S805 as a parameter, and stores the parameter in the LM 42 (S806).

Next, in the same manner as the previously described staging, the internal controller 62 in the FCA 60 outputs an instruction to the parameter control part 61 or the like, and the parameter control part 61 outputs the parameter stored in the LM 42 to the cache write control part 63. Next, the internal controller 62 outputs an instruction to a cache write control part 63 or the like, and the cache write control part 63 outputs the data encryption key contained in the parameter inputted in the processing in step S807 and read data read from the HDD 50 based on the parameter inputted in the processing in step S807 to the encryption and decryption circuit 70 (S807).

The encryption and decryption circuit 70 decrypts the read data using the data encryption key (data decryption key) (S808). Next, the encryption and decryption circuit 70 outputs the decrypted read data to the cache write control part 63, and the cache write control part 63 outputs the inputted decrypted read data to the cache memory 23 (S809). Due to such processing, the decrypted data is stored in the cache memory 23 based on the encryption state set in the RAID group.

After the processing in step S809 is executed, the MP 41 finishes the read processing S800.

On the other hand, when the encryption is not set as a result of determination in step S802, the MP 41 sets the predetermined parameter and stores the parameter in the LM 42 (S810).

Next, in the same manner as the above-described staging, the internal controller 62 in the FCA 60 outputs an instruction to the parameter control part 61 and the like, and the parameter control part 61 outputs the parameter stored in the LM 42 to the cache write control part 63. Next, the internal control part 62 outputs an instruction to the cache write control part 63 and the like, and the cache write control part 63 outputs the read data read from the HDD 50 based on the inputted parameter into the cache memory 23 (S811). Due to such processing, non-encrypted data is stored in the cache memory 23 based on an encrypted state set in the RAID group.

After the processing in step S811 is executed, the MP 41 finishes the read processing S800.

On the other hand, when the internal conversion encryption key is not acquired as a result of determination in step S804, the MP 41 responds to the host computer 10 which transmits a read command with a read error via the channel adapter 30 (S812). Next, the MP 41, in information which manages the LDEV stored in the shared memory 24, records information indicative of "closed" to all LDEV which belongs to the RAID group having the RAID group number (identifier) acquired in step S801 (S813). Due to such processing, the access to all LDEV belonging to the RAID group is inhibited.

After the processing in step S813 is executed, the MP 41 finishes the read processing S800.

The explanation has been made heretofore with respect to the example in which, based on the read command transmitted from the host computer 10, the read data read from the HDD 50 is stored in the cache memory 23. However, the present invention is not limited to such an example, and in staging which stores the data read from the HDD 50 in the cache memory 23, the write processing S700 is executed.

Figure 18:
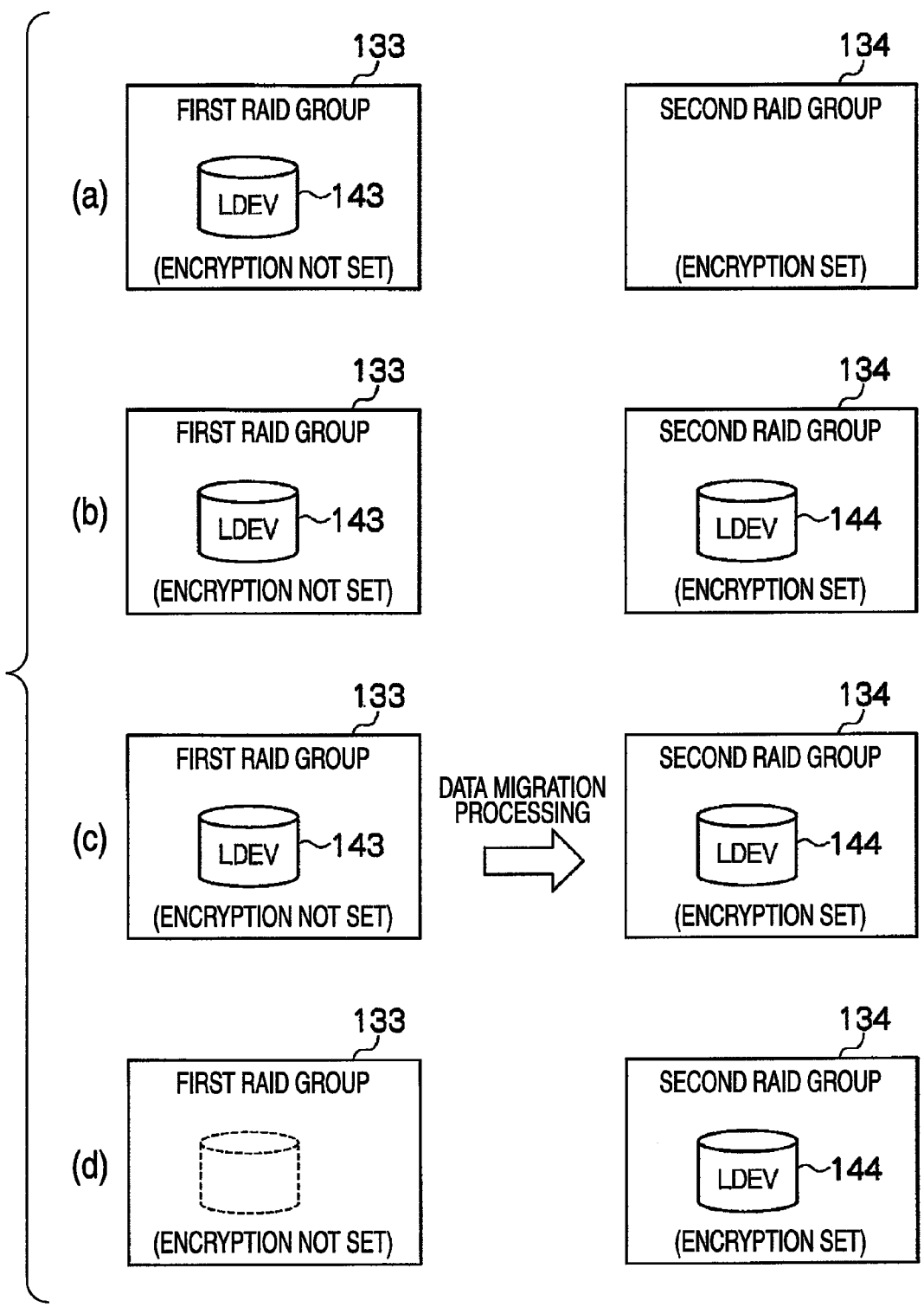
FIG. 18 is a state transition view for explaining the flow of data migration.
Figure 19:
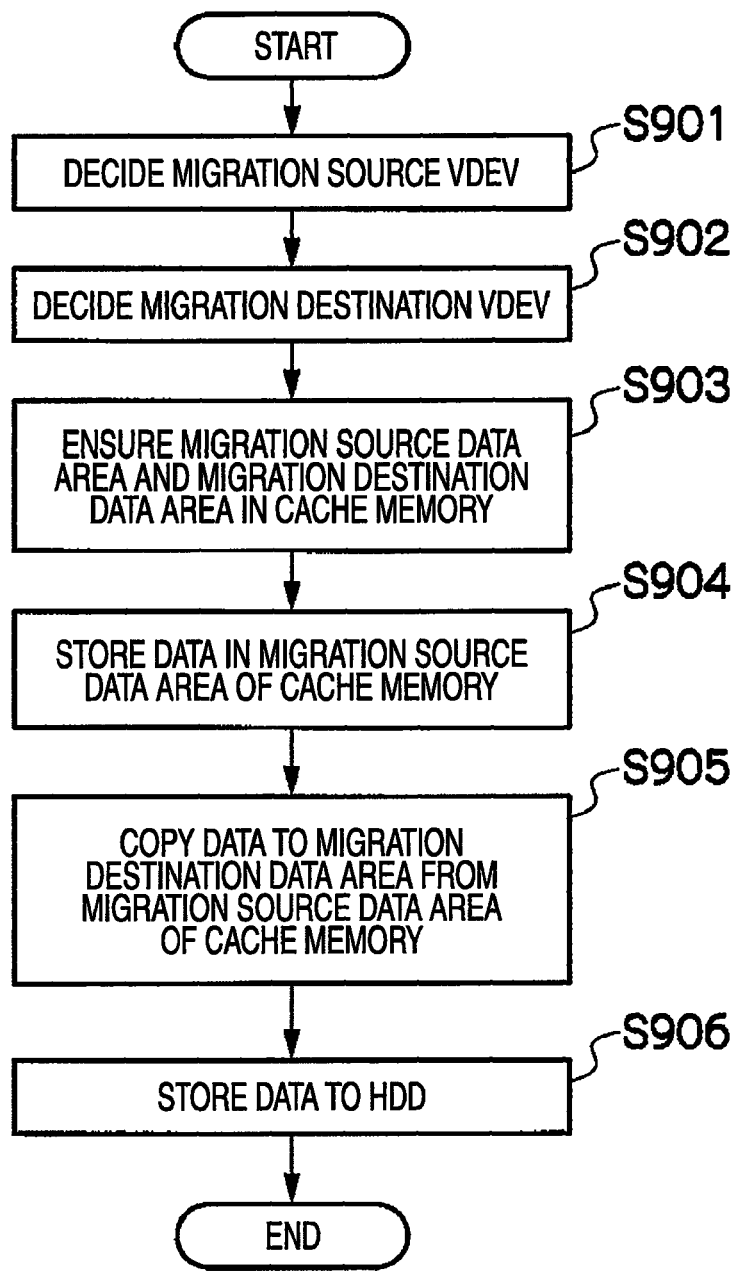
FIG. 19 is a flowchart for explaining the manner of operation in which an SVP and the disk adapter shown in FIG. 1 migrate the data.

Next, the manner of operation of the data migration is explained in conjunction with FIG. 18 and FIG. 19.

FIG. 18 is a state transition view for explaining the flow of the data migration. For example, when an encryption disk adapter 40 is added to the storage device 20 or when an ordinary disk adapter 40 (not provided with an encryption and decryption circuit 70) is converted into the encryption disk adapter 40, by migrating the data of the first RAID group to which the encryption is not applied to the second RAID group to which the encryption is applied, the data of the first RAID group can be encrypted.

That is, as shown in FIG. 18, in migrating the data stored in the LDEV 143 which belongs to the first RAID group 133 (see (a)), the LDEV 144 is newly added (defined) to the second RAID group or an existing LDEV 144 is formatted (initialized) (see (b)).

Next, the data migration processing in step S900 described later is executed between the LDEV 143 and the LDEV 144 (see (c)), and the LDEV 143 is released after completion of migration processing in step S900 (see (d)). Here, when all data in the first RAID group are migrated to the second RAID group, by repeating the above-mentioned processing (a) to (d) in FIG. 18 with respect to all LDEV which belongs to the first RAID group, it is possible to encrypt all data in the first RAID group.

FIG. 19 is a flowchart for explaining the manner of operation that the SVP and the disk adapter shown in FIG. 1 perform the data migration. For example, when a data migration request which designates a migration source LDEV number and the migration destination LDEV number is transmitted from the management terminal 13 via the network 12, the SVP 22 executes the data migration processing S900 shown in FIG. 19.

The SVP 22 which receives the data migration request, in the encryption management table 400 stored in the shared memory 24, reads a row (record) in which the LDEV number (identifier) of the designated migration source LDEV is stored in the LDEV-ID column 400C, and decides the RAID group having the RAID group number (identifier) stored in the RG-ID column 400A of the row (record) as the migration source RAID group (migration source VDEV) (S901). In the same manner, the SVP 22 reads a row (record) in which the LDEV number (identifier) of the designated migration destination LDEV is stored in the LDEV-ID column 400C, and decides the RAID group having the RAID group number (identifier) stored in the RG-ID column 400A of the row (record) as the migration destination RAID group (migration destination VDEV) (S902).

Next, the SVP 22 ensures a migration source data area and a migration destination data area in the cache memory 23 (S903)

Here, the SVP 22, in the RAID group management table 300 stored in the shared memory 24, reads a row (record) in which the RAID group number (identifier) of the migration source RAID group is stored in the RG-ID column 300A, and instructs the previously described staging to the MP 41 of the disk adapter 40 having the disk adapter number (identifier) stored in the DKA-ID column 300C of the row (record). Here, when the disk adapter numbers (identifiers) which are stored in the DKA-ID column 300C are provided in the plural number, the SVP 22 outputs the instruction to the MP 41 of the disk adapters 40 in predetermined order.

The MP 41 of the disk adapter 40 which receives the instruction from the SVP 22 performs the processing substantially equal to the above-mentioned read processing in step S800, and stores the data of the migration source LDEV in the migration source data area of the cache memory 23 (S904). Next, the MP 41 copies the data of the migration source LDEV to the migration destination data area from the migration source data area of the cache memory 23 (S905).

Here, the SVP 22, in the RAID group management table 300 stored in the shared memory 24, reads a row (record) in which the RAID group number (identifier) of the migration destination RAID group is stored in the RG-ID column 300A, and instructs the previously described destaging to the MP 41 of the disk adapter 40 having the disk adapter number (identifier) stored in the DKA-ID column 300C of the row (record). Here, when the disk adapter numbers (identifiers) which are stored in the DKA-ID column 300C are provided in the plural number, the SVP 22 outputs the instruction to the MP 41 of the disk adapters 40 in predetermined order.

The MP 41 of the disk adapter 40 which receives the instruction from the SVP 22 performs the processing substantially equal to the above-mentioned write processing in step S700, and stores the data of the migration source LDEV area of the cache memory 23 to the HDD 50 corresponding to the migration destination LDEV (S906). Here, when a data volume of the migration destination LDEV is larger than the migration source data area ensured in the processing in step S903, the data of the migration source LDEV is divided into a plurality of data having a predetermined volume and the processing in step S904 to step S906 are repeated for every data having a predetermined volume.

The SVP 22, after executing processing in step S904 to step S906 with respect to the MP 41 of all disk adapters 40, finishes the data migration processing S900.

After the migration is started, a write command whose data is not encrypted and is issued to the migration source LDEV is issued to the migration destination LDEV from the host computer 10 during the step of the data migration processing in step S900 or after finishing of the data migration processing in step S900, and the write data is stored in the migration destination LDEV.

Figure 20:
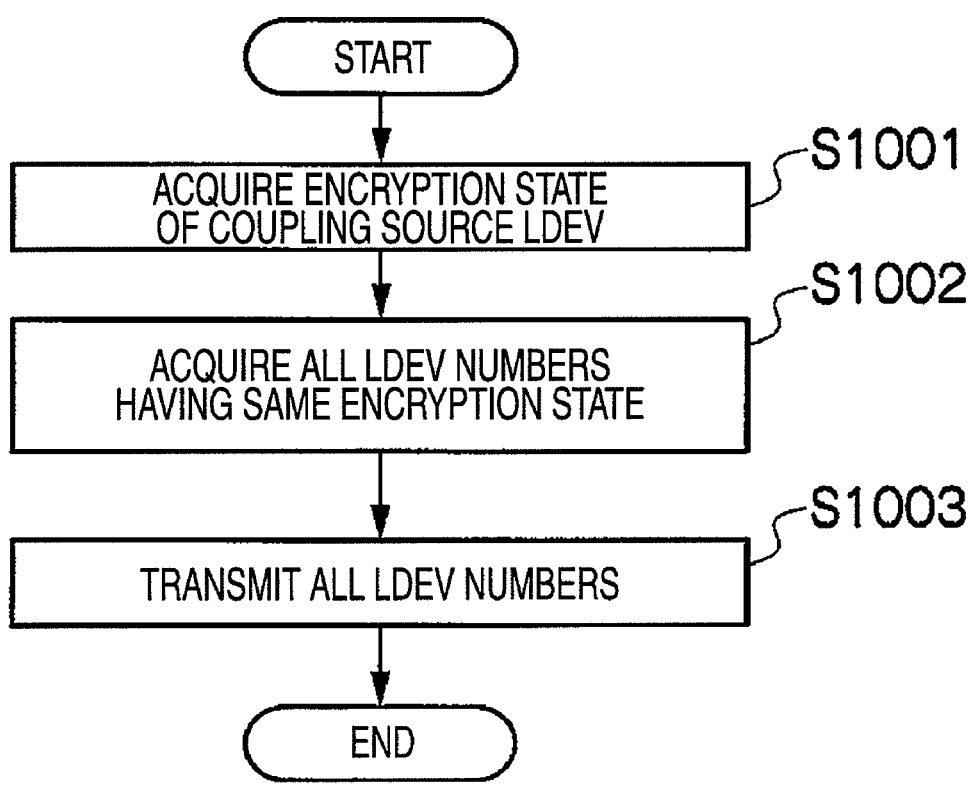
FIG. 20 is a flowchart for explaining the manner of operation in which the SVP shown in FIG. 1 connects LDEVs.

FIG. 20 is a flowchart for explaining the manner of operation in which the SVP 22 shown in FIG. 1 couples the LDEV with each other. For example, for expanding the volume of the LU, when a coupling object request which designates the LDEV number of the leading LDEV contained in the LU is transmitted from the management terminal 13 via the network 12, the SVP 22 executes the coupling object processing in step S1000 shown in FIG. 20.

That is, the SVP 22 which receives the coupling request, in the encryption management table 400 stored in the shared memory 24, reads a row (record) in which the LDEV number of the designated LDEV is stored in the LDEV-ID column 400C, and acquires the encryption state stored in the encryption setting column 400B of the row (record) (S1001). Next, the SVP 22 reads all rows (records) in which the encryption state acquired in step S1001 is stored in the encryption setting column 400B, and acquires all LDEV numbers (identifiers) stored in the LDEV-ID column 400C of the row (record) (S1002).

Next, the SVP 22 transmits all LDEV numbers (identifiers) acquired in step S1002 to the management terminal 13 via the network 12 as a response to the coupling object request (S1003), and finishes the coupling object processing S1000.

Figure 21:
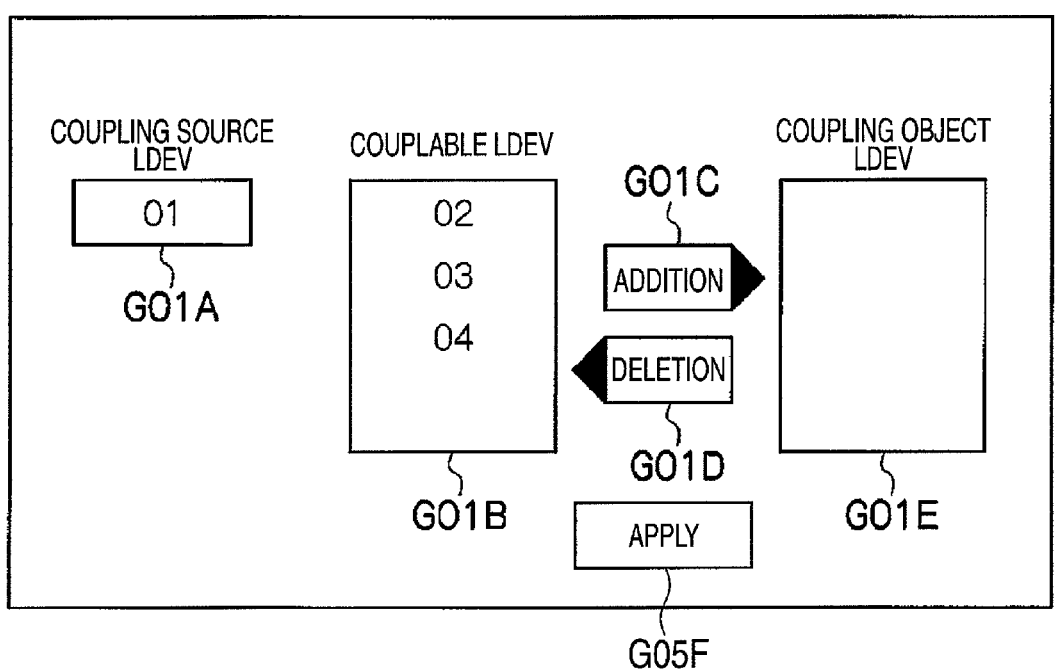
FIG. 21 is an image view for explaining one example of an LDEV coupled screen displayed on a management terminal.

FIG. 21 is an image view for explaining one example of an LDEV coupled screen displayed on the management terminal. The management terminal 13 which receives the response of the coupling request displays the LDEV coupled screen G01 shown in FIG. 21 on a monitor or the like. On the LDEV coupled screen G01, the LDEV number of the designated LDEV is displayed on a coupling source LDEV field G01A and, at the same time, the received LDEV number is displayed on a couplable LDEV field G01B. The administrator operates an addition button switch G01C so as to add the LDEV number displayed on the couplable LDEV field G01B to a coupling object LDEV field G01E or a deletion button switch G01D so as to delete the LDEV number from the coupling object LDEV field G01E.

After deciding the coupling object LDEV, when the administrator operates the execution button switch G05F, the LDEV number of the coupling source LDEV field G01A and the coupling request which designates all LDEV number of the coupling object LDEV field G01E are transmitted to the SVP 22 via the network 12, and are coupled to each other by the SVP 22. In this manner, only the LDEV having the same encryption state with the LDEV which constitutes the coupling source can be displayed as the LDEV of the coupling object, and the coupling source LDEV and the coupling object LDEV are coupled to each other and hence, it is possible to prevent the encryption area and the non-encryption area from being coupled to each other.

Figure 22:
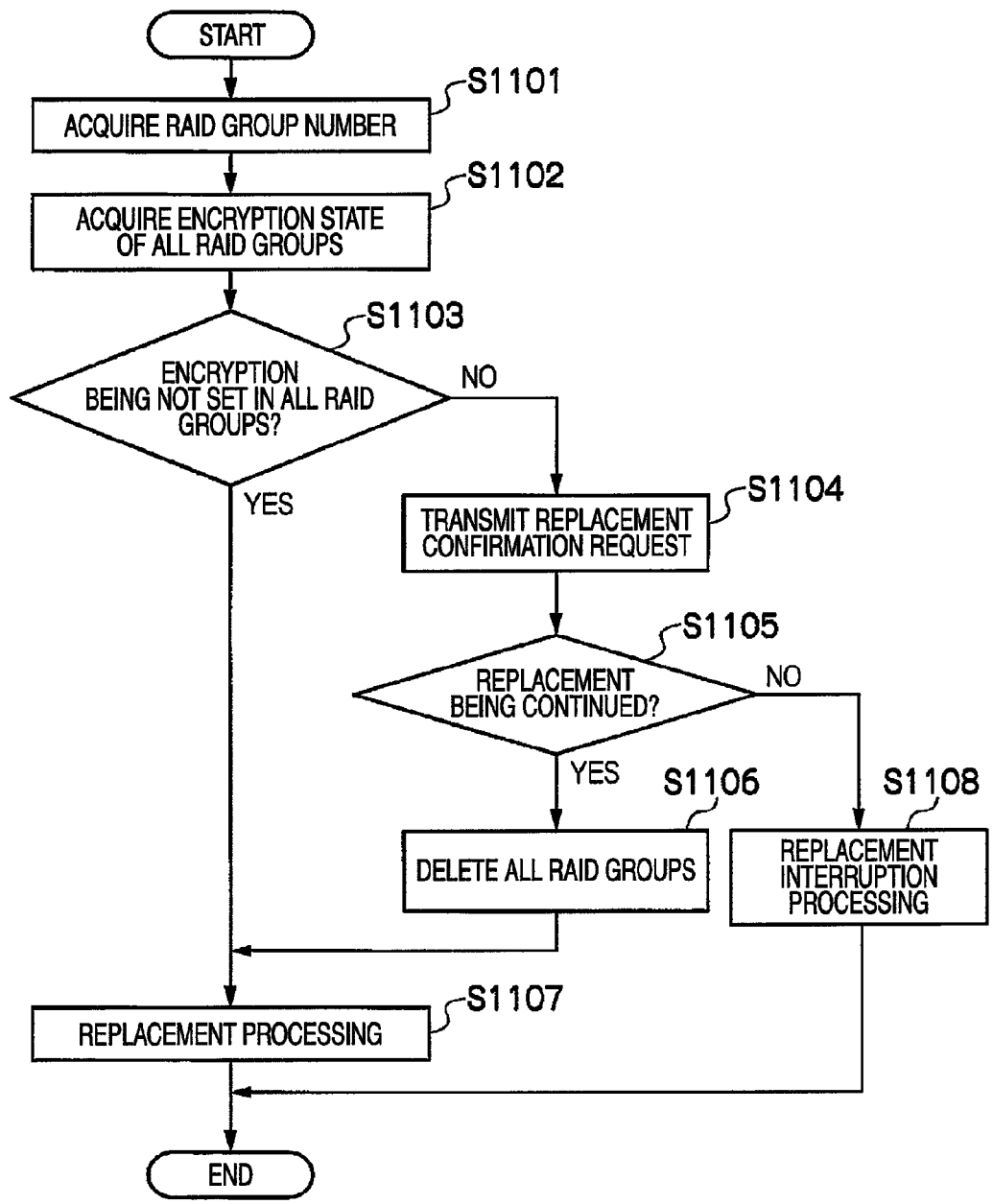
FIG. 22 is a flowchart for explaining the manner of operation which replaces the disk adapter shown in FIG. 1.

FIG. 22 is a flowchart for explaining the manner of operation to replace the disk adapter shown in FIG. 1. In exchanging the encryption disk adapter 40 provided to the storage device 20 with the ordinary disk adapter 40 (not provided with the encryption and decryption circuit 70), when a replacement request which designates the disk adapter number of the encryption disk adapter 40 which becomes a replacement object is transmitted from the management terminal 13 via the network 12, for example, the SVP 22 executes the disk adapter replacement processing in step S1100 shown in FIG. 22.

That is, the SVP 22 which receives the replacement request, in the RAID group management table 300 stored in the shared memory 24, reads a row (record) in which the disk adapter number (identifier) of the designated encryption disk adapter 40 is stored in the DKA-ID column 300C, and acquires the RAID group number (identifier) of the RAID group stored in the RG-ID column 300A of the row (record) (S1101). Here, as in the case of the disk adapters 40A, 40B shown in FIG. 4, when one disk adapter 40 belongs to two or more RAID groups, the RAID group number (identifiers) acquired by processing in step S1101 becomes plural.

Next, the SVP 22, in the encryption management table 400 stored in the shared memory 24, reads all rows (records) in which the RAID group number (identifier) acquired by processing in step S1101 is stored in the RG-ID column 400A, and acquires the encryption state stored in the encryption setting column 400B of the row (record) (S1102).

Next, the SVP 22 determines whether the encryption is not set in all RAID group or not based on the encryption state acquired in step S1102 (S1103). Here, when all of the encryption setting columns 400B are "OFF", it is determined that the encryption is not set in all RAID group, and when any one of the encryption setting columns 400B is "ON", it is determined that the encryption is set in any RAID group.

When the encryption is set in any RAID group as a result of the determination in step S1103, the SVP 22 transmits a replacement request which confirms whether or not the RAID group to which the designated disk adapter 40 belongs is deleted to the management terminal 13 via the network 12 (S1104).

Figure 23:
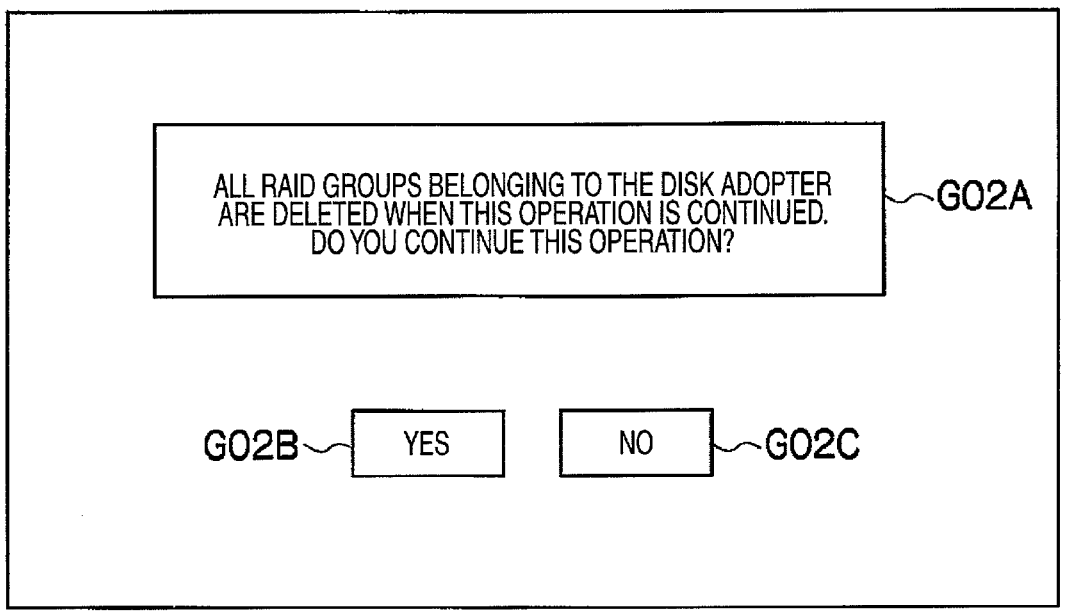
FIG. 23 is an image view for explaining one example of a confirmation screen displayed on the management terminal.

FIG. 23 is an image view for explaining one example of a confirmation screen displayed on the management terminal 13. The management terminal 13 which receives the replacement confirmation request displays the confirmation screen G02 shown in FIG. 23 on a monitor or the like. The confirmation screen G02 displays a message G02A indicative of an inquiry whether the replacement is to be continued or not, and the administrator operates one of a "YES" button switch G02B and a "NO" button switch G02C. Next, the management terminal 13 transmits a response to a replacement confirmation request based on the operation of either one of the "YES" button switch G02B and the "NO" button switch G02C to the SVP 22 via the network 12.

The SVP 22 which receives the response determines whether or not the replacement is to be continued based on the response (S1105). Here, when the "YES" button switch G02B is operated on the confirmation screen G02, it is determined that replacement is continued, while when the "NO" button switch G02C is operated on the confirmation screen G02, it is determined that replacement is not continued (interrupted).

When the replacement is continued as a result of the determination in step S1105, the SVP 22, which receives the firstly designated response deletes all RAID groups having the RAID group numbers (identifiers) acquired in the processing in step S1101 (S1106).

After the processing in step S1106 is finished, the SVP 22 executes predetermined replacement processing for exchanging the encryption disk adapter 40 with the disk adapter 40 (S1107), and the SVP22 finishes the disk adopter replacement processing S1100.

On the other hand, when the replacement is not continued as the result of the determination in step S1105, the SVP 22 executes predetermined replacement interruption processing (S1108), and the SVP 22 finishes the disk adopter replacement processing S1100.

Further, when the encryption is not set to all RAID groups, that is, when all data stored in the HDD 50 connected to the disk adapter 40 which is subject to replacement processing is not encrypted as the result of the determination in step S1103, the SVP 22 executes the previously mentioned predetermined replacement processing without executing processing in step S1104 to step S1106 (S1107), and the SVP 22 finishes the disk adapter replacement processing S1100. In this manner, the encryption state set in the RAID group to which the HDD connected to the encryption disk adapter 40 belongs does not encrypt all data, the encryption disk adapter 40 is replaced with the disk adapter 40 and hence, the encrypted data is stored in the HDD 50 connected to the disk adapter 40 which cannot be encrypted whereby there is no possibility that the encryption area where the encrypted data is stored and the non-encryption area where the non-encrypted data is stored are provided in mixture in one HDD 50. Accordingly, it is possible to prevent leaking of data attributed to steeling or taking out of the HDD 50.

The constitution of the present invention is not limited to the above-mentioned embodiments and various modifications may be applied without departing from the gist of the present invention.

What is claimed is:
1. A storage device which stores data in a plurality of disk devices which constitute one or more RAID groups, the storage device comprising:

a plurality of adapters each of which is connected to the plurality of disk devices which constitutes at least one of the RAID groups; and a management part which manages a storage area provided by the plurality of disk devices in a state that the storage area is divided into a plurality of logical storage areas, and manages the one or more RAID groups, wherein the plurality of disk devices respectively constitutes the one or more RAID groups, at least one of the plurality of adapters is an encryption adapter including an encryption circuit for encrypting data, the management part sets an encryption state indicative of whether or not the data is to be encrypted with respect to the one or more RAID groups only when all of the adapters connected to the disk devices which belong to the one or more RAID groups are determined by the management part to be encryption adapters, the encryption adapter encrypts, based on the encryption state set with respect to the one or more RAID groups to which the disk device constituting a storage destination of the data belongs, the data and stores the encrypted data in the disk device, and in order to prevent encrypted areas and non-encrypted areas from both being present together in a mixture in the one or more RAID groups to which the disk device constituting the storage destination of the data belongs, the management part sets the encryption state only when it is determined by the management part that all of the adapters connected to the disk devices which belong to the one or more RAID groups include an encryption circuit to thereby comprise encryption adapters.

2. A storage device according to claim 1, wherein the management part displays the encryption state of the logic storage area corresponding to the one or more RAID groups based on the encryption state set with respect to the one or more RAID groups.

3. A storage device according to claim 1, wherein the management part, in connecting the plurality of logical storage areas, the plurality of logical storage areas is connected with each other when all encryption states set in the RAID group corresponding to the plurality of logical storage areas are equal.

4. A storage device according to claim 1, wherein the management part, in exchanging the encryption adapter with the adapter, when the encryption state set in the RAID group to which a predetermined disk device connected to the encryption adapter belongs does not encrypt all data, replaces the encryption adapter with the adapter.

5. A storage device according to claim 1, wherein the encryption adapter includes a non-volatile memory, and a data encryption key which is used for encrypting the data is backed up by the non-volatile memory.

6. A storage device according to claim 5, wherein the storage device includes the plurality of encryption adapters, and each encryption adapter encrypts the data using one of the plurality of data encryption keys backed up by each non-volatile memory.

7. A storage device according to claim 1, wherein an external storage device is connected to the storage device, and the management part backs up the data encryption key used at the time of encrypting the data by the external storage device.

8. A storage device according to claim 7, wherein the management part backs up the data encryption key and additional information including at least one of a hash value corresponding to the data encryption key and identification information of the external storage device by the external storage device.

9. A storage device according to claim 7, wherein the encryption adapter, upon reception of the data encryption key from the external storage device, encrypts the data using the received data encryption key.

10. A storage device according to claim 8, wherein the storage device includes an additional information storage part which stores the additional information, and the encryption adapter, when the storage device receives the data encryption key and the additional information from the external storage device and the additional information stored in the additional information storage part and the received additional information agree with each other, encrypts the data using the received data encryption key.

11. A data processing method of a storage device which stores data in a plurality of disk devices which constitute one or more RAID groups, wherein the storage device comprises: a plurality of adapters each of which is connected to the plurality of disk devices which constitutes at least one of the RAID groups; and a management part which manages a storage area provided by the plurality of disk devices in a state that the storage area is divided into a plurality of logical storage areas, and manages the one or more RAID groups, wherein the plurality of disk devices respectively constitutes the RAID groups, and at least one of the plurality of adapters is an encryption adapter including an encryption circuit for encrypting data, the data processing method comprising:

a first step in which the management part sets an encryption state indicative of whether or not the data is to be encrypted with respect to the one or more RAID groups only when all of the adapters connected to the disk devices which belong to the one or more RAID groups are determined by the management part to be encryption adapters, and a second step in which the encryption adapter encrypts the data, based on the encryption state set with respect to the one or more RAID groups to which the disk device constituting a storage destination of the data belongs, and stores the encrypted data in the disk device, wherein, in order to prevent encrypted areas and non-encrypted areas from both being present together in a mixture in the one or more RAID groups to which the disk device constituting the storage destination of the data belongs, the management part sets the encryption state only when it is determined by the management part that all of the adapters connected to the disk devices which belong to the one or more RAID groups include an encryption circuit to thereby comprise encryption adapters.

12. A data processing method of a storage device according to claim 11, further comprising, after the first step, a third step in which the management part displays the encryption state of the logical storage area corresponding to the one or more RAID groups based on the encryption state set with respect to the RAID group.

13. A data processing method of a storage device according to claim 11, wherein the encryption adapter includes a non-volatile memory, and the data processing method further comprises, before the second step, a fourth step in which a data encryption key which is used in encrypting the data by the encryption adapter is backed up by the non-volatile memory.

14. A data processing method of a storage device according to claim 11, wherein an external storage device is connected to the storage device, and the data processing method further comprises, before the second step, a fifth step in which the management part backs up the data encryption key used in encrypting the data in the encryption adapter by the external storage device.

15. A data processing method of a storage device according to claim 11, further comprising, after the first step, a sixth step in which the management part, in connecting the plurality of logical storage areas, when all encryption states set in the one or more RAID groups corresponding to the plurality of logical storage areas are equal, connects the plurality of logical memory areas.

16. A storage device which stores data in a plurality of disk devices which constitute one or more RAID groups, the storage device comprising:
   a plurality of adapters each of which is connected to the plurality of disk devices which constitutes at least one of the RAID groups; and
   a management part which manages a storage area provided by the plurality of disk devices in a state that the storage area is divided into a plurality of logical storage areas, and manages the one or more RAID groups, wherein
   the plurality of disk devices respectively constitutes the one or more RAID groups,
   at least one of the plurality of adapters is an encryption adapter including an encryption circuit for encrypting data, said storage device further comprising:
   means for determining, via the management part, whether each of the plurality of adapters connected to the disk devices which belong to the one or more RAID groups includes the encryption circuit to thereby comprise an encryption adapter; and
   means for encrypting, via the at least one encryption adapter, based on the encryption data set with respect to the one or more RAID groups to which the disk device constituting a storage destination of the data belongs, the data and storing the encrypted data in the disk device, only if it is determined by the determining means that all of the adapters connected to the disk device which belongs to the one or more RAID groups include an encryption circuit to thereby constitute encryption adapters to prevent the presence together of both encrypted areas and non-encrypted areas in a mixture in the one or more RAID groups to which the disk device constituting the storage destination of the data belongs.

17. A storage device according to claim 16, wherein the management part displays the encryption state of the logic storage area corresponding to the one or more RAID groups based on the encryption state set with respect to the one or more RAID groups.

18. A storage device according to claim 17, wherein an external storage device is connected to the storage device, and the management part backs up the data encryption key used at the time of encrypting the data by the external storage device.

19. A storage device according to claim 16, wherein the encryption adapter includes a non-volatile memory, and a data encryption key which is used for encrypting the data is backed up by the non-volatile memory.

20. A storage device according to claim 19, wherein the storage device includes the plurality of encryption adapters, and each encryption adapter encrypts the data using one of the plurality of data encryption keys backed up by each non-volatile memory.

* * * * *